(12) United States Patent
Kuo

(10) Patent No.: US 6,775,300 B2
(45) Date of Patent: Aug. 10, 2004

(54) CLOCK DISTRIBUTION IN A COMMUNICATIONS NETWORK

(75) Inventor: Jerchen Kuo, Davis, CA (US)

(73) Assignee: Teknovus, Inc., Petaluma, CA (US)

(*) Notice: Subject to any disclaimer, the term of this patent is extended or adjusted under 35 U.S.C. 154(b) by 0 days.

(21) Appl. No.: 10/435,431

(22) Filed: May 9, 2003

(65) Prior Publication Data

US 2003/0214977 A1 Nov. 20, 2003

Related U.S. Application Data

(63) Continuation-in-part of application No. 10/245,854, filed on Sep. 17, 2002, now Pat. No. 6,624,763.
(60) Provisional application No. 60/379,210, filed on May 9, 2002, and provisional application No. 60/360,827, filed on Feb. 28, 2002.

(51) Int. Cl.[7] .................................................. H04J 3/06
(52) U.S. Cl. ....................... 370/503; 370/527; 370/528; 370/529; 375/363; 341/58; 341/59
(58) Field of Search ......................... 370/503, 527–529; 341/58–59; 375/363

(56) References Cited

U.S. PATENT DOCUMENTS

| | | | |
|---|---|---|---|
| 4,107,469 A | * | 8/1978 | Jenkins ........................ 370/505 |
| 4,486,739 A | | 12/1984 | Franaszek et al. |
| 4,558,445 A | * | 12/1985 | Novick ........................ 370/535 |
| 6,072,810 A | * | 6/2000 | Van der Putten et al. ... 370/503 |
| 6,198,413 B1 | | 3/2001 | Widmer |
| 6,295,272 B1 | | 9/2001 | Feldman et al. |
| 6,333,704 B1 | | 12/2001 | Jung et al. |
| 6,385,738 B1 | | 5/2002 | Lo |
| 6,624,763 B2 | * | 9/2003 | Kuo et al. .................... 341/58 |
| 2001/0024457 A1 | | 9/2001 | Barry et al. |
| 2001/0030978 A1 | | 10/2001 | Holloway et al. |

OTHER PUBLICATIONS

Frasier, Howard, Clause 36 Physical Coding Sublayer (PCS) and Physical Medium Attachment (PMA) sublayer, type 1000Base–X, IEEE Std 802.3, 2000 Edition, Local and Metropolitan Area Networks, pp. 962–1008.

* cited by examiner

Primary Examiner—Michael J. Tokar
Assistant Examiner—Khai M. Nguyen
(74) Attorney, Agent, or Firm—Mark Wilson

(57) ABSTRACT

Clock information related to a reference clock is distributed from a master network node to a slave network node in an asynchronous packet-based network by embedding the clock information into an additional bit stream and multiplexing the additional bit stream with a primary data stream using an out-of-band channel. Multiplexing the additional bit stream with the primary bit stream using an out-of-band channel may involve selecting yB codes of an xB/yB encoded bit stream to represent yB bits of the additional bit stream or to balance the running disparity of the xB/yB encoded bit stream. The clock information that is embedded into the additional bit stream is used to generate a clock that is synchronized with a reference clock. In an embodiment, the clock information represents the time difference between a transmitted frame of the additional bit stream and a next edge of the reference clock.

45 Claims, 19 Drawing Sheets

| A | B | C | D | E | F | G |
|---|---|---|---|---|---|---|
| Sequence Number | Primary Bit Stream (8B words) | 10B Code Name | 10B Code for Current RD− | 10B Code for Current RD+ | Additional Bit Stream | 10B Code Selection Logic |
| 1 | 000 00001 | /D1.0/ | 011101 0100 | 100010 1011 | 0 | 10B Code selected to represent the bit of the additional bit stream |
| 2 | 000 00101 | /D5.0/ | 101001 1011 | 101001 0100 | | 10B Code selected to balance the running disparity of the encoded bit stream |
| 3 | 000 11010 | /D26.0/ | 010110 1011 | 010110 0100 | 1 | 10B Code selected to represent the bit of the additional bit stream |
| 4 | 000 01111 | /D15.0/ | 010111 0100 | 101000 1011 | | 10B Code selected to balance the running disparity of the encoded bit stream |

FIG. 13

| A | B | C | D | E(±) | F(∓) | G | H | I | J | K | L | M | N |
|---|---|---|---|---|---|---|---|---|---|---|---|---|---|
| | Data Bits (8B Codes) | Byte Value | 10B Code Name | 10B Code for Current RD− (DC Balance + or Neutral) | 10B Code for Current RD+ (DC Balance − or Neutral) | New RD | RD Before Code Selection | Selected 10B Code | RD After Code Selection | Multiplexed Additional Bit Stream | RD Before Code Selection | Selected 10B Code | RD After Code Selection |
| 1 | 000 00001 | 01 | /D1.0/ | 011101 0100 | 100010 1011 | S | − | + | − | | − | − | − |
| 2 | 000 00101 | 05 | /D5.0/ | 101001 1011 | 101001 0100 | F | − | + | + | 0 | − | + | + |
| 3 | 000 11010 | 1A | /D26.0/ | 010110 1011 | 010110 0100 | F | + | − | + | | + | + | + |
| 4 | 000 01111 | 0F | /D15.0/ | 010111 0100 | 101000 1011 | S | − | + | − | 1 | + | − | − |
| 5 | 100 11101 | 9D | /D29.4/ | 101110 0010 | 010001 1101 | S | − | + | − | | + | − | + |
| 6 | 011 11111 | 7F | /D31.3/ | 101011 0011 | 010100 1100 | F | + | − | + | 0 | − | − | − |
| 7 | 101 01111 | AF | /D15.5/ | 010111 1010 | 101000 1010 | F | − | + | + | | − | − | − |
| 8 | 110 11000 | D8 | /D24.6/ | 110011 0110 | 001100 0110 | F | + | − | + | 0 | + | + | + |
| 9 | 001 11111 | 3F | /D31.1/ | 101011 1001 | 010100 1001 | F | − | + | + | | + | + | + |
| 10 | 111 11111 | FE | /D30.7/ | 011110 0001 | 100001 1110 | S | − | + | − | 1 | + | − | + |
| 11 | 001 00111 | 27 | /D7.1/ | 111000 1001 | 000111 1001 | S | + | − | + | | + | + | + |
| 12 | 001 01111 | 2F | /D15.1/ | 010111 1001 | 101000 1001 | F | − | + | − | 0 | + | − | − |
| 13 | 000 10110 | 16 | /D22.0/ | 011010 1011 | 011010 0100 | F | + | − | − | 1 | − | + | + |

FIG. 18

CLOCK DISTRIBUTION IN A COMMUNICATIONS NETWORK

CROSS REFERENCE TO RELATED APPLICATIONS

This application claims the benefit of provisional U.S. patent application serial No. 60/379,210 filed May 9, 2002, and is a continuation-in-part of utility patent application Ser. No. 10/245,854 filed 17 Sep. 2002 now U.S. Pat. No. 6,624,763, which claims the benefit of provisional U.S. patent application serial No. 60/360,827 filed 28 Feb. 2002.

FIELD OF THE INVENTION

The invention relates to clock distribution in a communications network and more specifically to clock distribution between a master network node and a slave network node in an asynchronous packet-based communications network.

BACKGROUND OF THE INVENTION

Traditional telecommunications networks are circuit-switched synchronized networks. Packet-switched networks are typically not synchronized networks. In particular, the well-known Ethernet protocol is an unsynchronized network protocol that transmits traffic in packet bursts. In leading edge packet-switched networks, it is desirable to be able to carry digital voice and data over the same network. Transmitting traffic in bursts in an unsynchronized network is not naturally suited for constant bit rate traffic, such as digital voice traffic, that is sensitive to time delay and jitter. In order to carry constant bit rate (CBR) traffic, such as voice traffic, over an asynchronous packet-based network at an acceptable quality of service (QoS), communications between nodes in the network should be synchronized. Network synchronization techniques involve distributing master clock information from one node of a network to another node of the network. Typically, clock information is distributed from one node to another by transmitting synchronization markers to a slave network node at constant time intervals. In bursty network environments, such as Ethernet networks, it is difficult to distribute clock information at constant time intervals.

In view of the desire to carry digital voice over a network connection using an unsynchronized network protocol such as Ethernet, what is needed is a technique for distributing a clock between nodes of a network connection that can function in a bursty network environment.

SUMMARY OF THE INVENTION

Clock information related to a reference clock is distributed from the master network node to the slave network node in an asynchronous packet-based network by embedding the clock information into an additional bit stream and multiplexing the additional bit stream with a primary data stream using an out-of-band channel. The multiplexed stream can then be transmitted from the master network node to the slave network node, where the embedded clock information is demultiplexed from the additional bit stream. In an embodiment, multiplexing the additional bit stream with the primary bit stream using an out-of-band channel involves selecting yB codes of an xB/yB encoded bit stream to represent bits of the additional bit stream or to balance the running disparity of the xB/yB encoded bit stream. The clock information that is embedded into the additional bit stream is used at the slave network node to generate a clock that is synchronized with a reference clock at the master network node. In an embodiment, the clock information represents the time difference between a transmitted frame of the additional bit stream and a next edge of the reference clock. Other data that is carried in the additional bit stream, such as CBR and/or TDM voice data, can then be synchronized to the newly generated clock at the slave network node, thereby creating a synchronized end-to-end connection for the additional bit stream.

Other aspects and advantages of the present invention will become apparent from the following detailed description, taken in conjunction with the accompanying drawings, illustrating by way of example the principles of the invention.

BRIEF DESCRIPTION OF THE FIGURES

FIG. 13 depicts an example of code selection logic that is involved with multiplexing an additional bit stream with a primary bit stream in an 8B/10B encoded GbE bit stream in accordance with an embodiment of the invention.

FIG. 18 depicts a table that details the differences between the encoding of a GbE bit stream according to the prior art and the encoding of a GbE bit stream that includes a multiplexed additional bit stream in accordance with an embodiment of the invention.

DETAILED DESCRIPTION

FIGS. 1–10 depict a system and method by which clock information can be transported between two network nodes in an asynchronous packet based network. For example, clock information related to a reference clock is transported across a one gigabit Ethernet (GbE) link from a network node at a central office to a network node, or nodes, at a customer premises. Throughout the description, the network node from which the clock information is transported is referred to as the master network node and the network node that receives the clock information is referred to as the slave network node. In an embodiment, clock information related to a reference clock is distributed from the master network node to the slave network node by embedding the clock information into an additional bit stream, multiplexing the additional bit stream with a primary data stream using an out-of-band channel, transmitting the multiplexed stream from the master network node to the slave network node, and demultiplexing the embedded clock information at the slave network node. In an embodiment, multiplexing the additional bit stream with the primary bit stream using an out-of-band channel involves selecting yB codes of an xB/yB encoded bit stream to represent bits of the additional bit stream or to balance the running disparity of the xB/yB encoded bit stream. In an embodiment, the clock information that is embedded into the additional bit stream is used at the slave network node to generate a clock that is synchronized with the reference clock at the master network node. Other data that is carried in the additional bit stream, such as CBR and/or TDM voice data, can then be synchronized to the newly generated clock at the slave network node, thereby creating a synchronized end-to-end connection for the additional bit stream.

Figure 1:
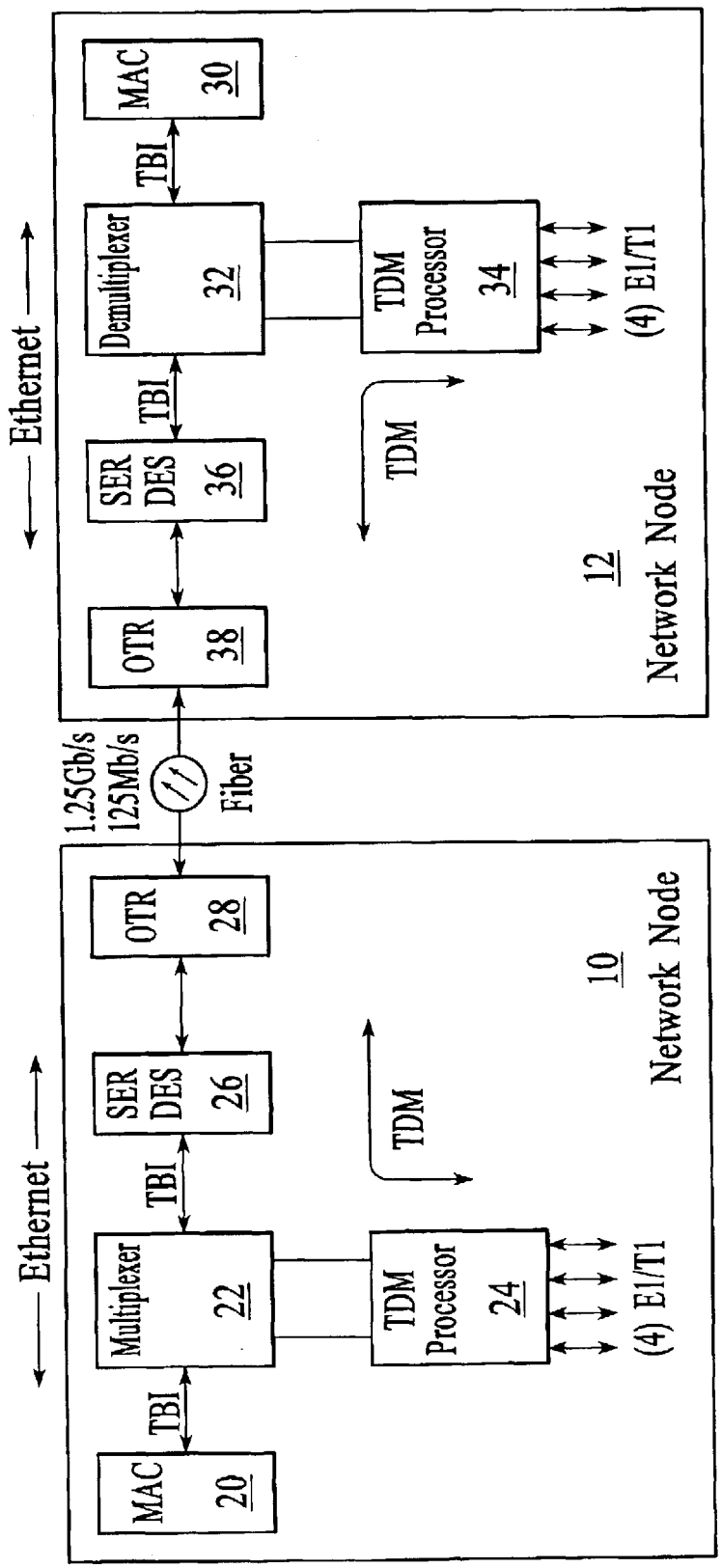
FIG. 1 depicts two network nodes and that are connected by a one GbE optical link, the network nodes include functional blocks for multiplexing an additional bit stream with a primary bit stream and for distributing clock information.

In a first exemplary embodiment, FIG. 1 depicts functional blocks of two network nodes 10 and 12 that are connected by a one GbE optical link (note that because of the 8B/10B block coding scheme specified in the IEEE 802.3z standard, a one GbE optical link requires a line transmission rate of 1.25 gigabits per second (Gbps)). For example purposes, the network node depicted on the left side of FIG. 1 is located at a central office and is referred to as the master network node and the network node depicted on the right side of FIG. 1 is located at a customer premises and is referred to as the slave network node. The functional blocks within the master network node 10 include a media access control unit (MAC) 20, a multiplexer 22, a TDM processor 24, a serializer/deserializer (SERDES) 26, and an optical transmitter/receiver (OTR) 28. The functional blocks within the slave network node 12 include an OTR 38, a SERDES 36, a demultiplexer 32, a TDM processor 34, and a MAC 30. The MACs, SERDESs, TDM processors, and OTRs are well known functional blocks.

Figure 2:
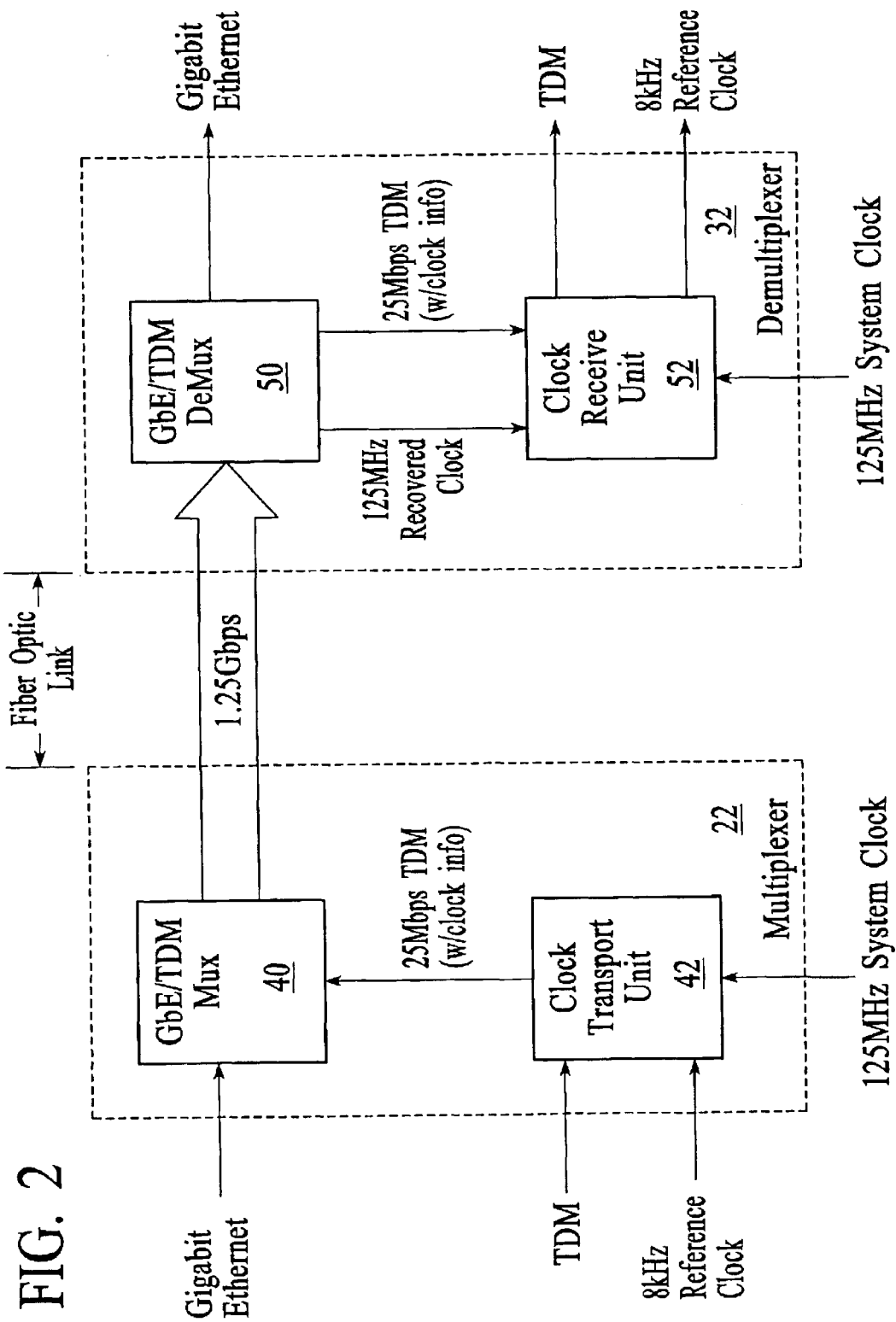
FIG. 2 depicts an expanded view of embodiments of the multiplexer and demultiplexer that are depicted in FIG. 1.

In the embodiment of FIG. 1, the multiplexer 22 of the master network node 10 performs the multiplexing of the additional bit stream (including the clock information) with the primary bit stream (i.e., a one GbE stream) using an out-of-band channel. The demultiplexer 32 of the slave network node 12 performs the demultiplexing of the additional bit stream (including the clock information) from the primary bit stream using the out-of-band channel. FIG. 2 depicts an expanded view of embodiments of the multiplexer 22 and demultiplexer 32 that are depicted in FIG. 1. In the embodiment of FIG. 2, the multiplexer includes a GbE/TDM multiplexer 40 and a clock transport unit 42 and the demultiplexer 32 includes a GbE/TDM demultiplexer 50 and a clock receive unit 52. The functions performed by these elements are described herein. Throughout the description, the same or similar reference numbers may be used to reference similar elements.

Master Network Node

With reference to FIG. 2, the GbE/TDM multiplexer 40 at the master network node uses an out-of-band channel that involves disparity manipulation to multiplex an additional bit stream with a primary bit stream. In the embodiment of FIG. 2, the additional bit stream is a 25 Mbps TDM stream and the primary bit stream is a one GbE stream (1.25 Gbps line transmission rate), although other rates of traffic could be used. In an alternative embodiment, the additional bit stream is an n×12.5 Mbps TDM stream. The additional bit stream includes the clock information that is to be transported from the master network node to the slave network node. Multiplexing an additional bit stream with a primary data stream using disparity manipulation as the out-of-band channel is described in more detail below. As is described below, multiplexing the additional bit stream with the primary bit stream using an out-of-band channel does not consume any of the bandwidth of the GbE stream. That is, the additional bit stream is not included in the payload of the Ethernet packets that form the GbE stream.

The clock transport unit 42 of the multiplexer 22 embeds the desired clock information into the additional bit stream (i.e., the TDM stream). In the embodiment of FIG. 2, the clock transport unit embeds clock information related to an 8 kHz reference clock into the additional bit stream, where the additional bit stream may include, for example, a T1/E1 TDM stream or multiple T1/E1 TDM streams that are synchronized to the reference clock. That is, in an embodiment, the payload portion of the additional bit stream includes time sensitive data, such as voice data, that is synchronized with the same clock from which the clock information was obtained. In an embodiment, the clock information that is embedded into the additional bit stream is in the form of a counter value (sometimes referred to as a timestamp) that is related to a position of an edge of the reference clock. In the embodiment of FIG. 2, the counter value is obtained from a digital counter that is incremented by a 125 MHz system clock that is local to the master network node.

Figure 3:
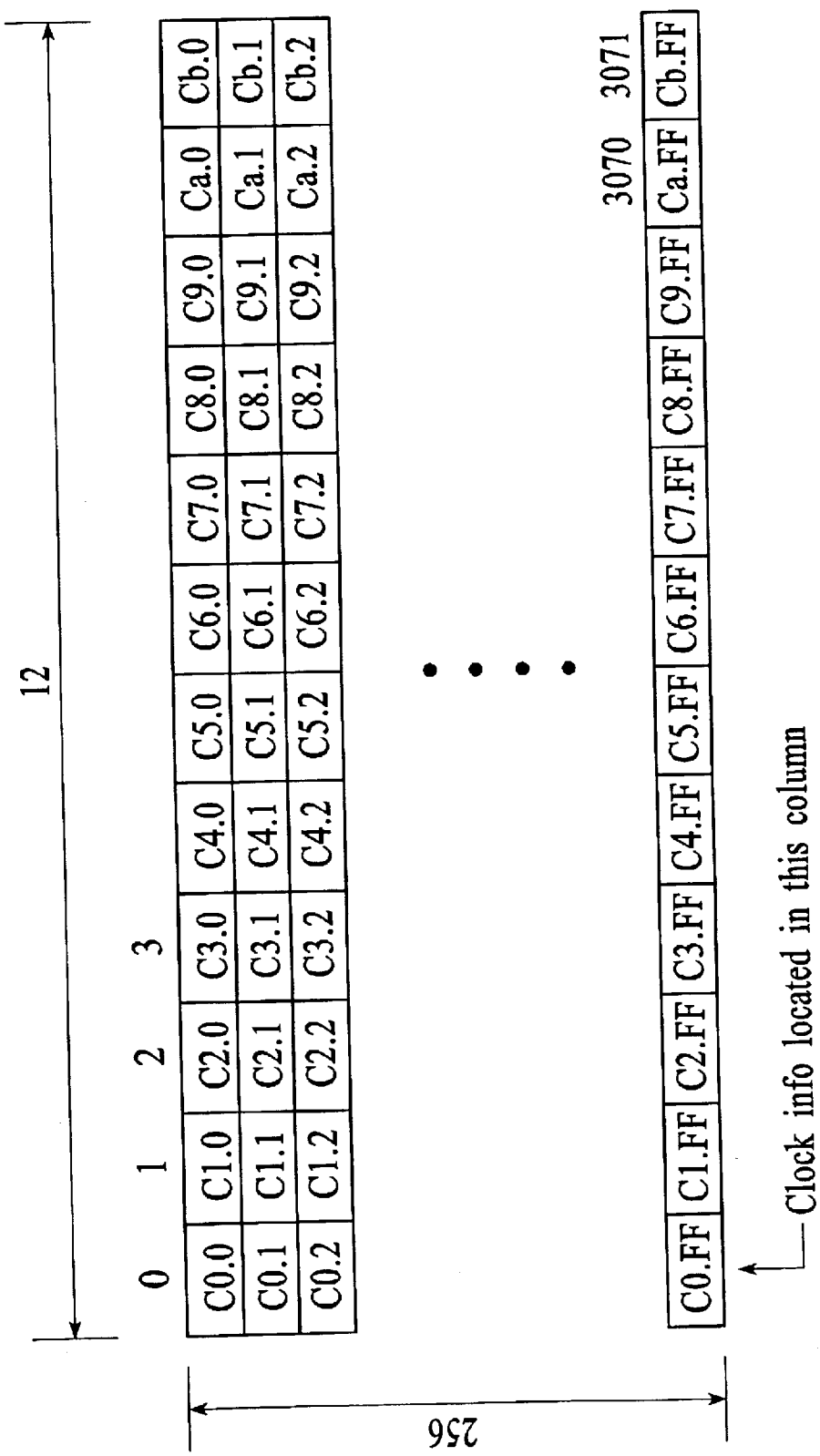
FIG. 3 depicts an example frame structure of the additional bit stream.

In an embodiment, the additional bit stream is multiplexed with the primary bit stream in frames. In an embodiment, the additional bit stream frames are transmitted at fixed time intervals and are of a fixed length. For example, in the embodiments of FIGS. 1 and 2, additional bit stream frames are transmitted from the master network node at 122.88 microsecond (us) intervals. At a transmission rate of 25 Mbps, each frame includes 3,072 bits of information. An example frame structure is depicted in FIG. 3. Referring to FIG. 3, the example frame structure includes 12 columns of 256 bits. In an embodiment, management information is included at the beginning (i.e., the first column) of each frame. In the example of FIG. 3, the management information includes the clock information. The rest of each frame is used to carry the payload of the additional bit stream, for example, TDM data (i.e., PCM, T1/E1 voice data). Throughout the description, additional bit stream frames that carry TDM data, such as T1/E1 data, may be referred to as "TDM frames." Although "TDM frames" are referred to for description purposes, it should be noted that the additional bit stream may include other types of digital data.

Figure 4:
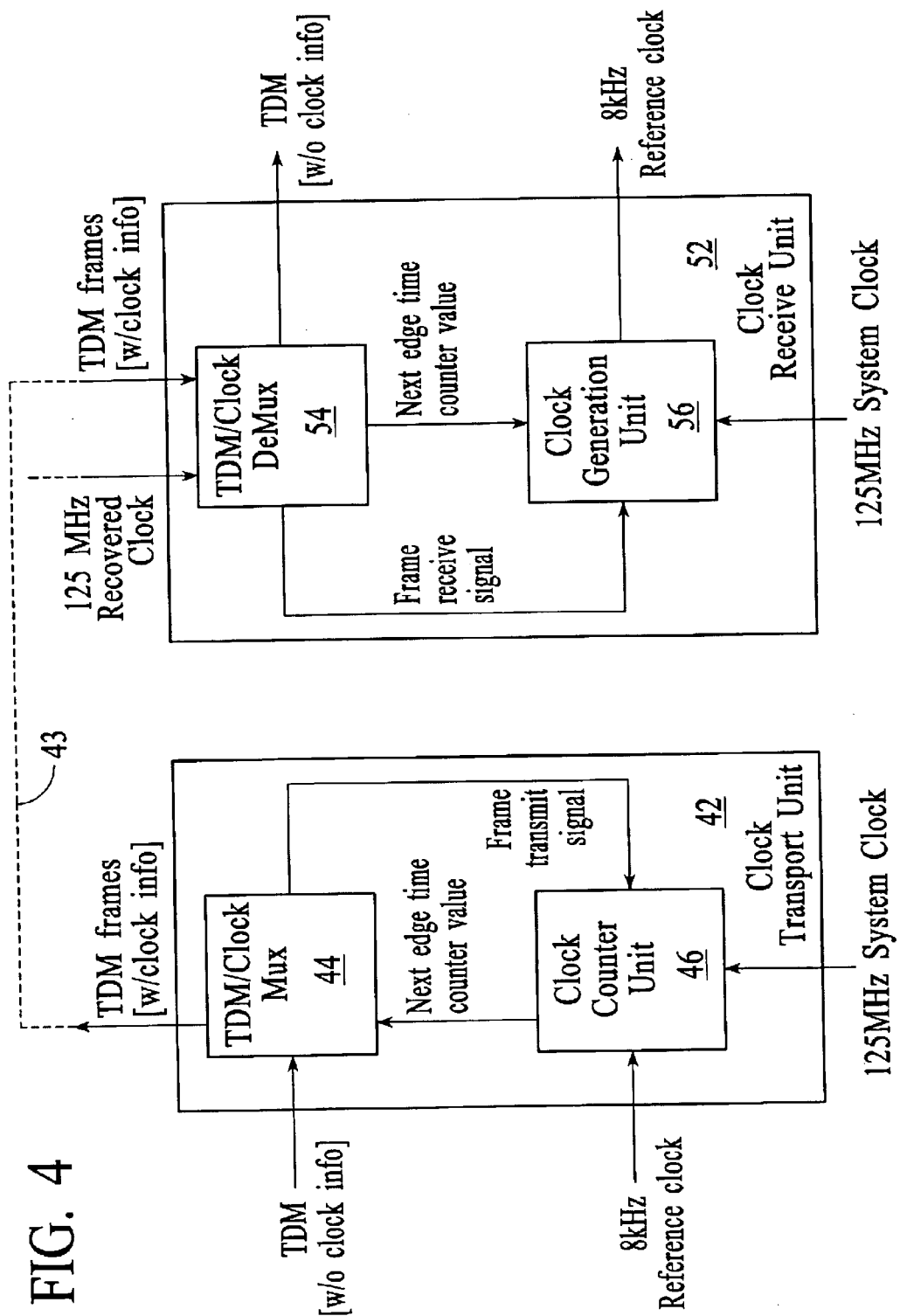
FIG. 4 depicts an expanded view of an embodiment of the clock transport unit that is depicted in FIG. 2.

FIG. 4 depicts an expanded view of an embodiment of the clock transport unit 42 from FIG. 2. The clock transport unit of FIG. 4 includes a TDM/Clock multiplexer 44 and a clock counter unit 46. With reference to the clock counter unit, the clock counter unit receives a reference clock (i.e., an 8 kHz reference clock that is to be transported to the slave network node) and a system clock (i.e., a 125 MHz system clock) that is used to determine the edges of the reference clock. In an embodiment, the edges of the reference clock are determined by sampling the reference clock at each cycle of the system clock and then using the samples to determine either each rising edge or each falling edge of the reference clock. In an embodiment, the system clock has a much higher frequency than the reference clock. For example, the system clock may have a frequency of at least 10,000 times greater than the reference clock. In the present example, the frequency of the 125 MHz system clock is 15,625 times greater than the frequency of the 8 kHz reference clock.

In an embodiment of the clock counter unit 46, a digital counter is incremented at the rate of 125 MHz in response to the system clock. The reference clock is sampled at each cycle of the system clock. When an edge of the reference clock is detected, the counter value associated with the detected edge is obtained (i.e., "latched") and the resulting counter value, referred to herein as the Next Edge Time Counter Value, is output from the clock counter unit 46 as indicated in FIG. 4. In an embodiment, the system clock is reset at the beginning of each TDM frame transmission and as a result, the Next Edge Time Counter Value represents the elapsed time between the beginning of a frame transmission (the "start of frame") and the occurrence of an edge of the reference clock. In the embodiment of FIG. 4, the beginning of a TDM frame transmission is indicated by a frame transmit signal that is received from the TDM/Clock multiplexer 44 or from some other source within the master network node.

The Next Edge Time Counter Value that is output from the clock counter unit 46 is provided to the TDM/Clock multiplexer 44 as the clock information. The TDM/Clock multiplexer formats the TDM data and the clock information (i.e., the Next Edge Time Counter Values) into TDM frames, for example, the frame depicted in FIG. 3. In an embodiment, generating the TDM frames includes embedding a Next Edge Time Counter Value into a specified field within each frame. Completed TDM frames (including the clock information) are output from the TDM/Clock multiplexer and provided to the GbE/TDM multiplexer. Ultimately, the TDM frames (including the clock information) are provided to the clock receive unit 52 of the slave network node as indicated by dashed line 43 in FIG. 4.

In an embodiment, the Next Edge Time Counter Value that is embedded into a particular TDM frame relates to a previously transmitted TDM frame and a previously occurring clock edge. In one embodiment, the Next Edge Time Counter Value associated with a particular TDM frame is carried in the subsequent TDM frame. Thus, the Next Edge Time Counter Value embedded within a TDM frame represents an edge of the reference clock that occurred during transmission of the previous TDM frame. For example, in the TDM frame of FIG. 3, the Next Edge Counter Value embedded into the frame represents the 8 kHz clock edge that occurred during the transmission of the previous TDM frame. In an embodiment where the 8 kHz reference clock has edges at 125 us intervals and where TDM frames are transmitted at 122.88 us intervals, no more than one clock edge can occur during a single TDM frame transmission and therefor no more than one Next Edge Time Counter Value need be embedded into each TDM frame. In an embodiment, the transmission interval of the additional bit stream frames is smaller than the time interval between edges (either rising edges or falling edges) of the reference clock to ensure that no more than one edge (either rising edge or falling edge) of the reference clock occurs during a single TDM frame transmission.

Figure 5:
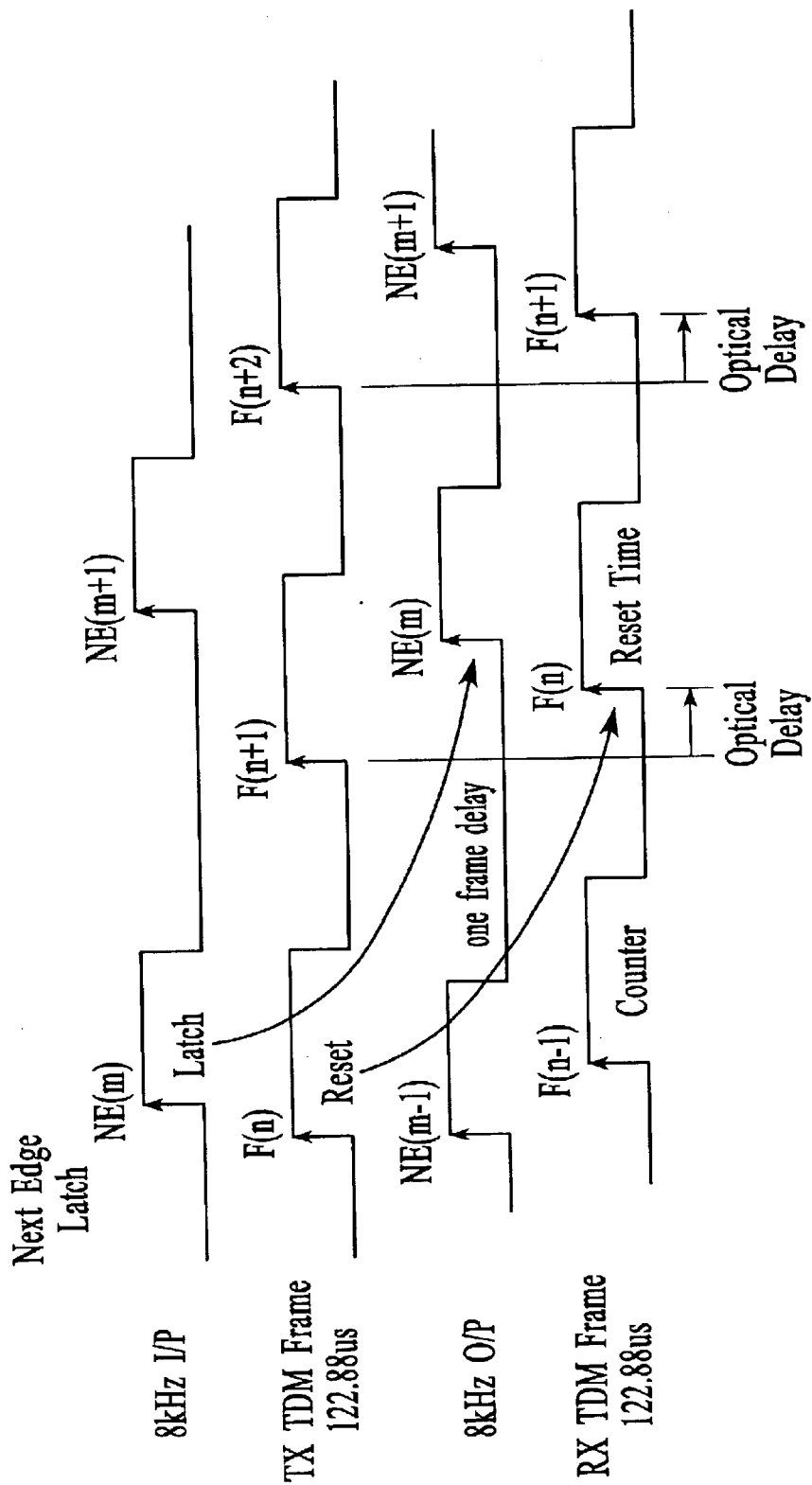
FIG. 5 depicts example waveforms of an 8 kHz reference clock in relation to TDM frames that are transmitted at fixed time intervals between two network nodes.

FIG. 5 depicts example waveforms of an 8 kHz reference clock in relation to TDM frames that are transmitted at fixed time intervals between two network nodes (i.e., the network nodes 10 and 12 that are depicted in FIG. 1). The upper two waveforms are related to the transmit side of the link (i.e., at the master network node) and the lower two waveforms are related to the receive side of the same link (i.e., at the slave network node). Referring to the transmission side waveforms, the clock counter is reset at the beginning of each frame transmission and the value of the clock counter is latched at the next edge of the reference clock that occurs after frame transmission begins. Because the reference clock has an edge every 125 us while TDM frames are transmitted every 122.88 us, no more than one edge (either rising edge or falling edge) of the 8 kHz reference clock occurs during each TDM frame transmission. Referring to the receive side waveforms, the Next Edge Time Counter Value is received with a one frame delay. In an embodiment, the frame interval is selected such that the frame interval is shorter than the reference clock interval (e.g., 122.88 us<125 us) so that no more than one edge of the reference clock occurs during each frame transmission.

Slave Network Node

Once the primary bit stream (including the multiplexed additional bit stream) is received at the slave network node, the additional bit stream is demultiplexed from the primary bit stream and the clock information is obtained from the additional bit stream. The clock information is used at the slave network node to generate a clock that is synchronized with the reference clock (i.e., the 8 kHz reference clock) from the master network node. Referring back to FIG. 2, the GbE/TDM demultiplexer 50 at the slave network node decodes the received disparity manipulated stream to demultiplex the additional bit stream from the primary bit stream. For example, the 25 Mbps TDM stream is demultiplexed from the GbE stream. Decoding of the received disparity manipulated stream is described in more detail below. Upon demultiplexing the additional bit stream from the primary bit stream, the 25 Mbps additional bit stream is forwarded to the clock receive unit 52. The clock receive unit obtains the clock information from the additional bit stream and uses the clock information to generate a clock that is synchronized with the reference clock (i.e., the 8 kHz reference clock) at the master network node.

FIG. 4 depicts an example embodiment of the clock receive unit 52 of FIG. 2. In the embodiment of FIG. 4, the clock receive unit includes a TDM/Clock demultiplexer 54 and a clock generation unit 56. In an embodiment, the TDM/Clock demultiplexer 54 demultiplexes the clock information, in the form of Next Edge Time Counter Values, from the TDM frames by reading the bits from the fields in the frames that have been designated for the clock information. In an embodiment, the TDM/Clock demultiplexer uses a 125 MHz clock that is recovered from the GbE transmission to read the clock information from the TDM stream. The TDM/Clock demultiplexer forwards the clock information, in the form of Next Edge Time Counter Values, to the clock generation unit as indicated in FIG. 4. The clock generation unit uses the clock information to generate a clock that is synchronized with the reference clock (i.e., the 8 kHz reference clock) at the master network node. In an embodiment, the clock generation unit generates the 8 kHz clock by comparing each Next Edge Time Counter Value with a local clock counter that is incremented with a system clock (i.e., a 125 MHz system clock that is local to the slave network node) and that is reset upon receiving each respective TDM frame. The time at which the incremented clock counter is equal to the Next Edge Time Counter Value indicates an edge of the 8 kHz clock. The desired clock is generated in response to the edge indications.

Digital Clock Counter Unit and Digital Clock Generation Unit

Figure 6:
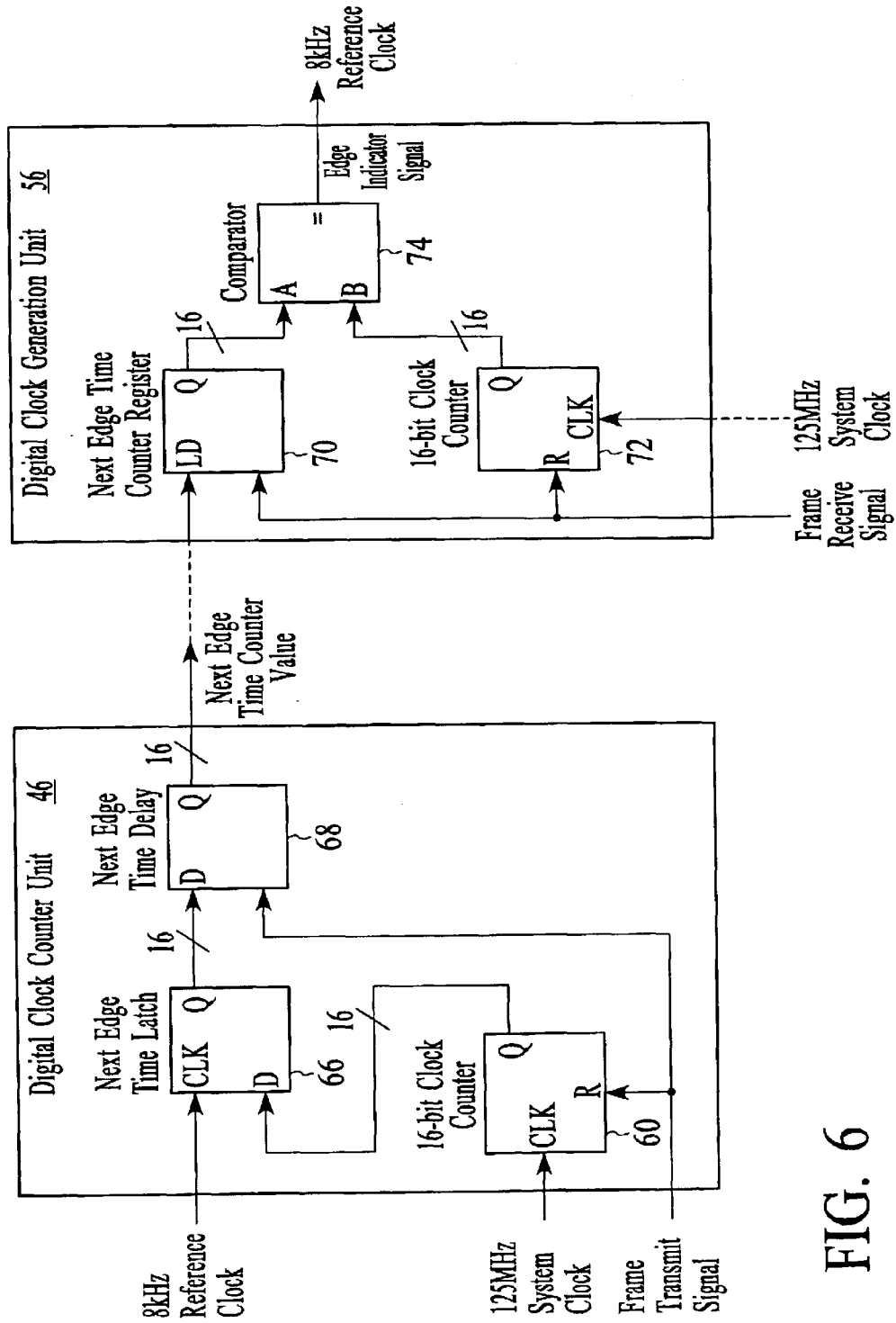
FIG. 6 depicts example embodiments of the clock counter unit and the clock generation unit that are depicted in FIG. 4.

FIG. 6 depicts example embodiments of the clock counter unit 46 and the clock generation unit 56 that are described with reference to FIG. 4. In the embodiment of FIG. 6, the clock counter and clock generation units are embodied in digital logic. The digital clock counter unit 46 includes a 16-bit clock counter 60, a next edge time latch 66, and a next edge time delay 68 and the digital clock generation unit 56 includes a next edge time counter register 70, a 16-bit clock counter 72, and a comparator 74.

With reference to the digital clock counter unit 46 at the master network node, the 16-bit clock counter is a digital clock counter that is incremented in response to a system clock, for example, a 125 MHz system clock that is local to the master network node. In an embodiment, the digital clock counter is reset at the beginning of each frame transmission in response to a frame transmit signal. The digital clock counter outputs 16-bit counter values to the next edge time latch 66. The next edge time latch samples the reference clock at each cycle of the 125 MHz system clock and outputs a 16-bit counter value (the Next Edge Time Counter Value) at each edge of the reference clock. Because the 16-bit clock counter is reset at the start of each frame transmission, the Next Edge Time Counter Value represents the time difference between the start of a frame transmission and the next edge of the reference clock. In an embodiment, next edge time latch 66 includes D flip-flop (D-FF) circuits. Although D flip-flop circuits are described herein, other circuits may be implemented to achieve the same result.

As described above, in the embodiment of FIG. 6, the 16-bit Next Edge Time Counter Value is not sent in the TDM frame to which the counter value is related. In an embodiment, the Next Edge Time Counter Value related to a first frame is embedded into the subsequent frame and therefor transmission of the Next Edge Time Counter Value needs to be delayed by one frame. In order to delay the Next Edge Time Counter Value by one frame, the digital clock counter unit 46 includes the next edge time delay 68. The next edge time delay holds the 16-bit counter value for a first frame and then receives the 16-bit counter value for a subsequent frame in response to the frame transmit signal. Although in the embodiment of FIG. 6, a delay of one frame is utilized, the delay can be different in other implementations.

With reference to the digital clock generation unit 56 at the slave network node, the Next Edge Time Counter Value that is generated at the master network node by the digital clock counter unit 46 is received at the slave network node by the digital clock generation unit as described above with reference to FIGS. 1–5. In the embodiment of FIG. 6, the 16-bit clock counter 72 in the digital clock generation unit is a digital clock counter that is incremented by a system clock, for example, a 125 MHz system clock that is local to the slave network node.

In operation, upon receipt of a TDM frame, the next edge time counter register 70 loads the corresponding Next Edge Time Counter Value from the received frame and the 16-bit counter is reset. The digital clock counter 72 is reset upon the receipt of each frame transmission in response to a frame receive signal. The 16-bit Next Edge Time Counter Value is then continually compared to the incrementing 16-bit counter value. When the Next Edge Time Counter Value and the incrementing counter value from the 16-bit counter value are equal to each other, a next edge indicator signal is output from the comparator 74. The next edge indicator signal is then utilized to generate a reference clock. In the embodiment of FIG. 6, the next edge indicator signal is used to generate an 8 kHz clock (i.e., a "recovered" clock) that is frequency synchronized with the 8 kHz reference clock of the master network node.

Alternative Embodiment

Figure 7:
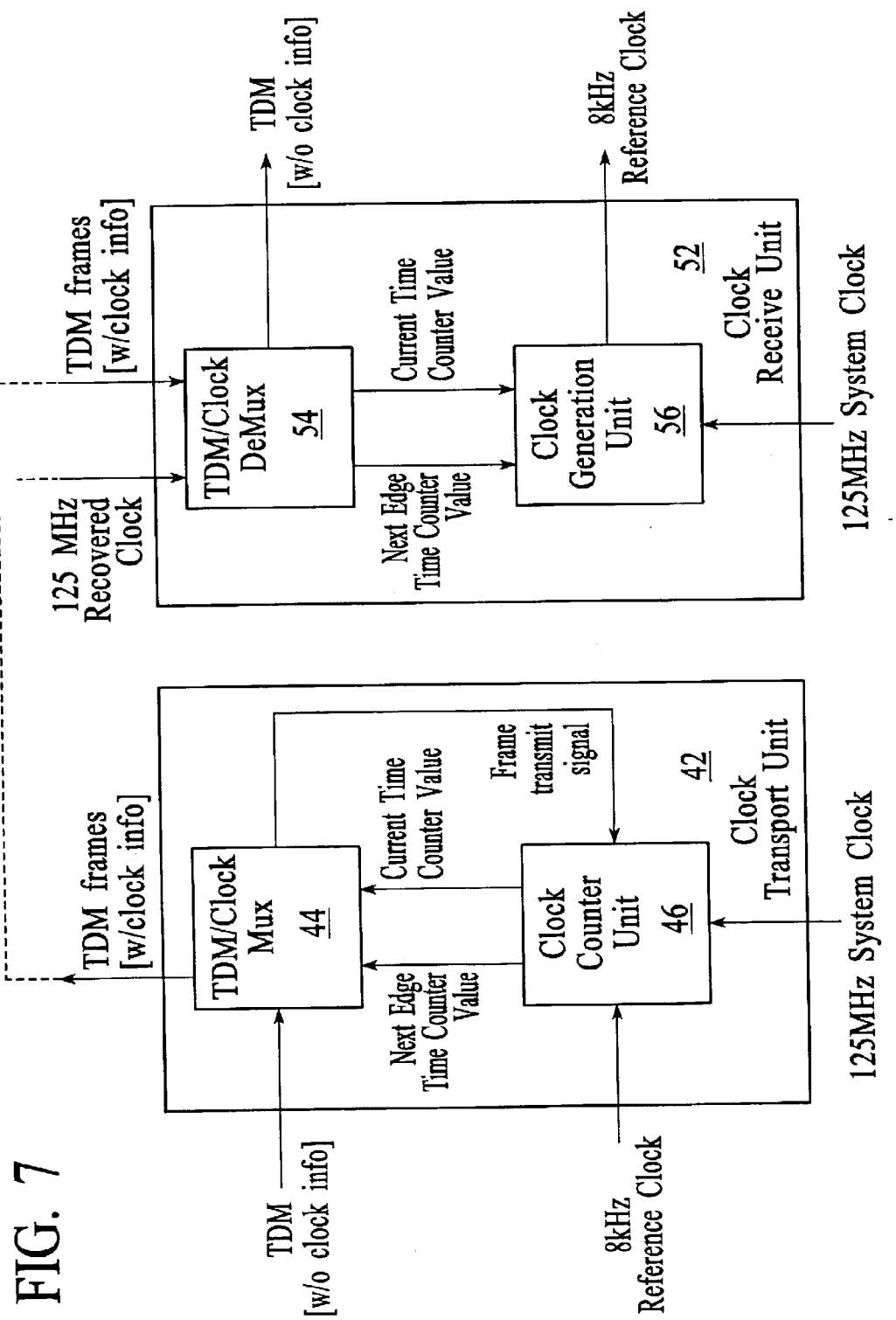
FIG. 7 depicts an expanded view of an embodiment of the clock transport unit that is depicted in FIG. 2.
Figure 8:
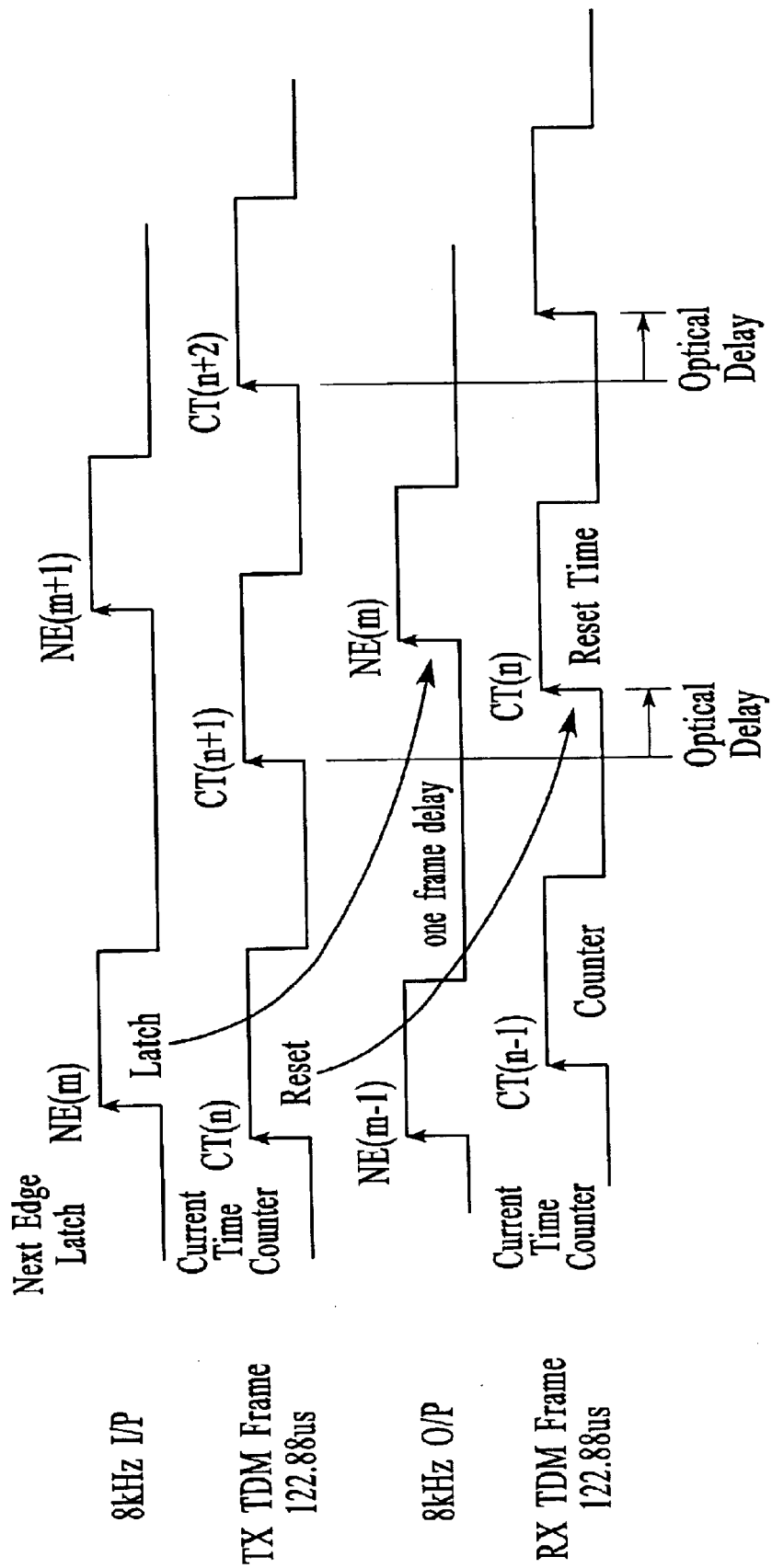
FIG. 8 depicts example waveforms of an 8 kHz reference clock in relation to TDM frames that are transmitted between two network nodes.
Figure 9:
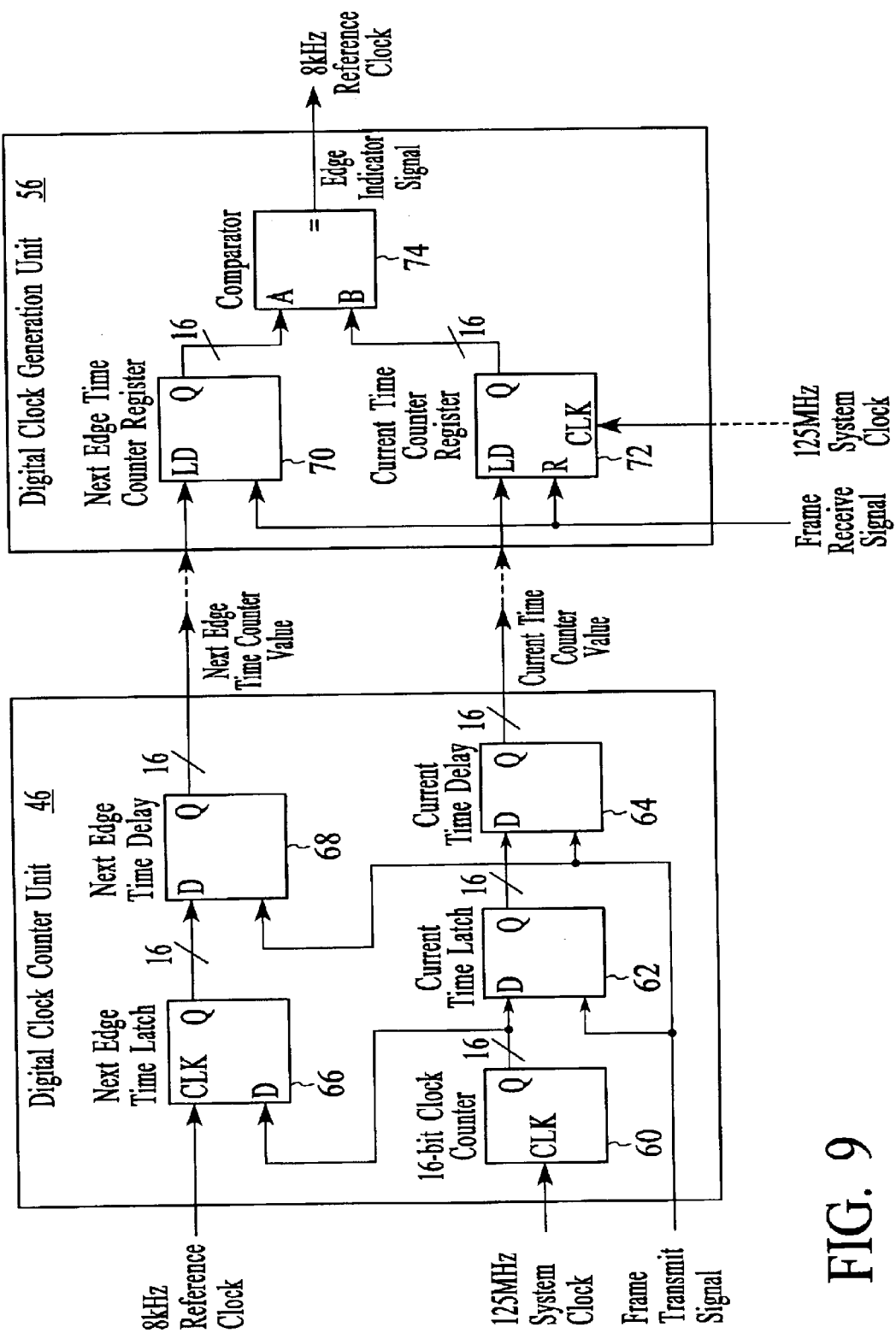
FIG. 9 depicts example embodiments of the clock counter unit and the clock generation unit that are depicted in FIG. 7.

FIGS. 7–9 depict an alternative embodiment of a system for distributing a clock from a master network node to a slave network node in the environment described with reference to FIGS. 1 and 2. The embodiment described with reference to FIGS. 7–9 is similar to the embodiment described with reference to FIGS. 3–6 except that two pieces of clock information are obtained and used to distribute a clock. FIG. 7 depicts an expanded view of an embodiment the clock transport unit 42 from FIG. 2. The clock transport unit of FIG. 7 includes a TDM/Clock multiplexer 44 and a clock counter unit 46. The clock counter unit receives the desired clock (i.e., the 8 kHz reference clock that is to be transported to the slave network node) and a system clock (i.e., a 125 MHz system clock that is local to the master network node). The system clock is used, as described above, to increment a clock counter and to determine the edges of the reference clock. When an edge of the reference clock is detected, the counter value associated with the detected edge is obtained (i.e., "latched") and the resulting counter value, referred to herein as the Next Edge Time Counter Value, is output from the clock counter unit. In addition to the Next Edge Time Counter Value, the clock counter unit also outputs a Current Time Counter Value. The Current Time Counter Value represents the time at which a TDM frame is transmitted. For example, the Current Time Counter Value is a 16-bit counter value that is obtained in response to a frame transmit signal. The frame transmit signal indicates the transmission of a TDM frame and may be received from the TDM/Clock multiplexer or from some other source within the master network node. Clock information in the form of the Next Edge Time and Current Time Counter Values is embedded into the TDM frame, as described above, for transport to the slave network node.

In an embodiment, the Current Time and Next Edge Time Counter Values that are embedded into a particular TDM frame relate to a previously transmitted TDM frame and to a previously occurring reference clock edge. In one embodiment, the Current Time and Next Edge Time Counter Values associated with a particular TDM frame are carried in the subsequent TDM frame. In an embodiment, the Next Edge Time Counter Value embedded within a particular TDM frame represents an edge of the desired clock that occurs during transmission of the TDM frame that was transmitted at the time that is represented by the Current Time Counter Value. For example, in the TDM frame of FIG. 3, the Next Edge Counter Value represents the 8 kHz reference clock edge that occurred during the transmission of the TDM frame that was sent at the time that is represented by the Current Time Counter Value. Again, because the TDM frames are sent at fixed 122.88 us intervals while the 8 kHz clock has edges at 125 us intervals, no more than one clock edge can occur during a single TDM frame.

FIG. 8 depicts example waveforms of an 8 kHz reference clock in relation to TDM frames that are transmitted between two network nodes (i.e., the network nodes 10 and 12 that are depicted in FIG. 1). As depicted in FIG. 8, the Current Time Counter Value is latched at the beginning of each frame transmission and the Next Edge Time Counter Value is latched at each edge of the reference clock.

Once the primary bit stream (including the multiplexed additional bit stream) is received at the slave network node, the additional bit stream is demultiplexed from the primary bit stream and the clock information is obtained from the additional bit stream. The clock information is used at the slave network node to generate a clock that is synchronized with the reference clock (i.e., the 8 kHz reference clock) from the master network node.

FIG. 7 depicts an example embodiment of the clock receive unit 52 of FIG. 2. The clock receive unit includes a TDM/Clock demultiplexer 54 and a clock regeneration unit 56. The TDM/Clock demultiplexer demultiplexes the Next Edge Time and Current Time Counter Values from the TDM stream by reading the bits from the fields in the TDM frame that have been designated for the counter values. The TDM/Clock demultiplexer forwards the clock information, in the form of the Current Time and Next Edge Time Counter Values, to the clock generation unit as indicated in FIG. 7. The clock generation unit uses the two counter values to generate an 8 kHz clock that is synchronized with the 8 kHz reference clock at the master network node. The clock generation unit generates the 8 kHz clock by loading the Next Edge Time and Current Time Counter Values into a comparator and incrementing the Current Time Counter Value with a system clock (i.e., a 125 MHz system clock that is local to the slave network node). The time at which the Current Time Counter Value is equal to the Next Edge Time Counter Value indicates an edge of the 8 kHz clock. The desired clock is generated in response to the edge indications.

FIG. 9 depicts an example embodiment of a digital clock counter unit 46 and a digital clock generation unit 56 that can be used to distribute a reference clock from a master network node to a slave network node. In the embodiment of FIG. 9, the digital clock counter unit includes a 16-bit clock counter 60, a current time latch 62, a current time delay 64, a next edge time latch 66, and a next edge time delay 68. In the embodiment of FIG. 9, the 16-bit clock counter 60 is a digital counter that is incremented by a system clock, for example, a 125 MHz system clock that is local to the master network node. The counter outputs 16-bit counter values to the current time latch 62 and to the next edge time latch 66. The current time latch outputs a 16-bit counter value (the Current Time Counter Value) that indicates the transmit time of a TDM frame. The current time latch generates Current Time Counter Values in response to frame transmit signals. The next edge time latch outputs a 16-bit counter value (the Next Edge Time Counter Value) that indicates the edge time of the 8 kHz reference clock. Specifically, the 16-bit counter value that is received from the counter is latched at each edge (either the rising or falling edge) of the 8 kHz reference clock.

In the embodiment of FIG. 9, the 16-bit Current Time and Next Edge Time Counter Values cannot be sent in the TDM frame to which the Counter Values are related. In an embodiment, the Current Time and Next Edge Time Counter Values related to a first TDM frame are embedded into the subsequent TDM frame and therefor transmission of the Current Time and Next Edge Time Counter Values needs to be delayed by one frame. The Current Time and Next Edge Time Counter Values are delayed by current time and next edge time delays 64 and 68, respectively.

The Current Time and Next Edge Time Counter Values that are generated by the digital clock counter unit 46 at the master network node are received by the digital clock generation unit 56 at the slave network node. In the embodiment of FIG. 9, the digital clock generation unit includes a next edge time counter register 70, a current time counter register 72, and a comparator 74. In operation, the current time counter register loads the next Current Time Counter Value in response to a frame receive signal. Likewise, the next edge time counter register loads the corresponding Next Edge Time Counter Value in response to the frame receive signal. The 16-bit Next Edge Time Counter Value is then loaded into the comparator at input "A." With reference to the current time counter register, the Current Time Counter Value is incremented within the current time counter register in response to a 125 MHz system clock that is local to the slave network node. The incremented Current Time Counter Value is loaded into the comparator at input "B." The input counter values at "A" and "B" are then continually compared to each other. When the Next Edge Time and the incremented Current Time Counter Values are equal to each other, a next edge indicator signal is output from the comparator. The next edge indicator signal is then utilized to generate the desired clock. In the embodiment of FIG. 9, the next edge indicator signal is used to generate an 8 kHz clock that is frequency synchronized with the 8 kHz reference clock of the master network node. In an embodiment, the Next Edge Time and Current Time Counter Values are compared directly from their respective registers without being loaded into a comparator.

Figure 10:
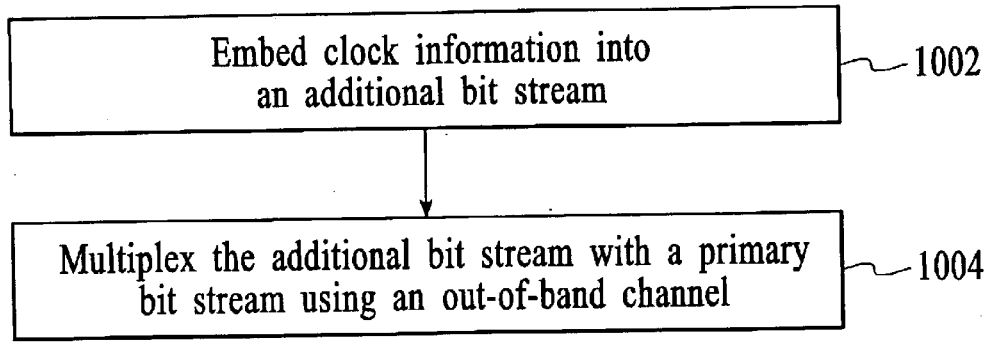
FIG. 10 depicts a process flow diagram of a method for distributing clock information from a first network node to a second network node in a packet based network.

FIG. 10 depicts a process flow diagram of a method for distributing clock information from a first network node to a second network node in a packet-based network. At step 1002, clock information is embedded into an additional bit stream. At step 1004, the additional bit stream is multiplexed with a primary bit stream using an out-of-band channel.

Figure 11:
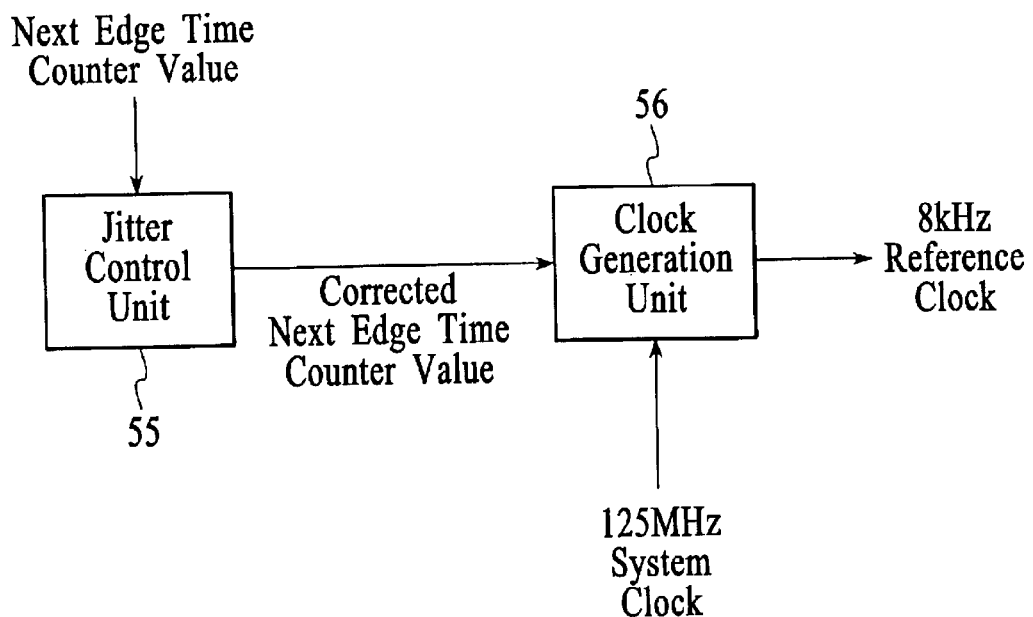
FIG. 11 depicts a jitter control unit that is located functionally before the clock generation unit that is depicted in FIG. 4.

Because of differences in transport times across the network some amount of jitter will be incorporated into the Next Edge Time Counter Values and consequently into the 8 kHz clock that is generated from the Next Edge Time Counter Values. In order to provide high quality synchronization between the master and slave network nodes, it is desirable to minimize the amount of jitter in the Next Edge Time Counter Values. In an embodiment of the system, a jitter control unit is added at the slave network node to minimize the jitter in the Next Edge Time Counter Values and consequently in the 8 kHz clock that is generated from the Next Edge Time Counter Values. FIG. 11 depicts a jitter control unit 55 that is located functionally before the clock generation unit 56 that is depicted in FIG. 4. The jitter control unit operates to smooth out the differences across a series of Next Edge Time Counter Values. For example, the differences in Next Edge Time Counter Values can be corrected for as a running average over a number of Next Edge Time Counter Values.

Figure 12:
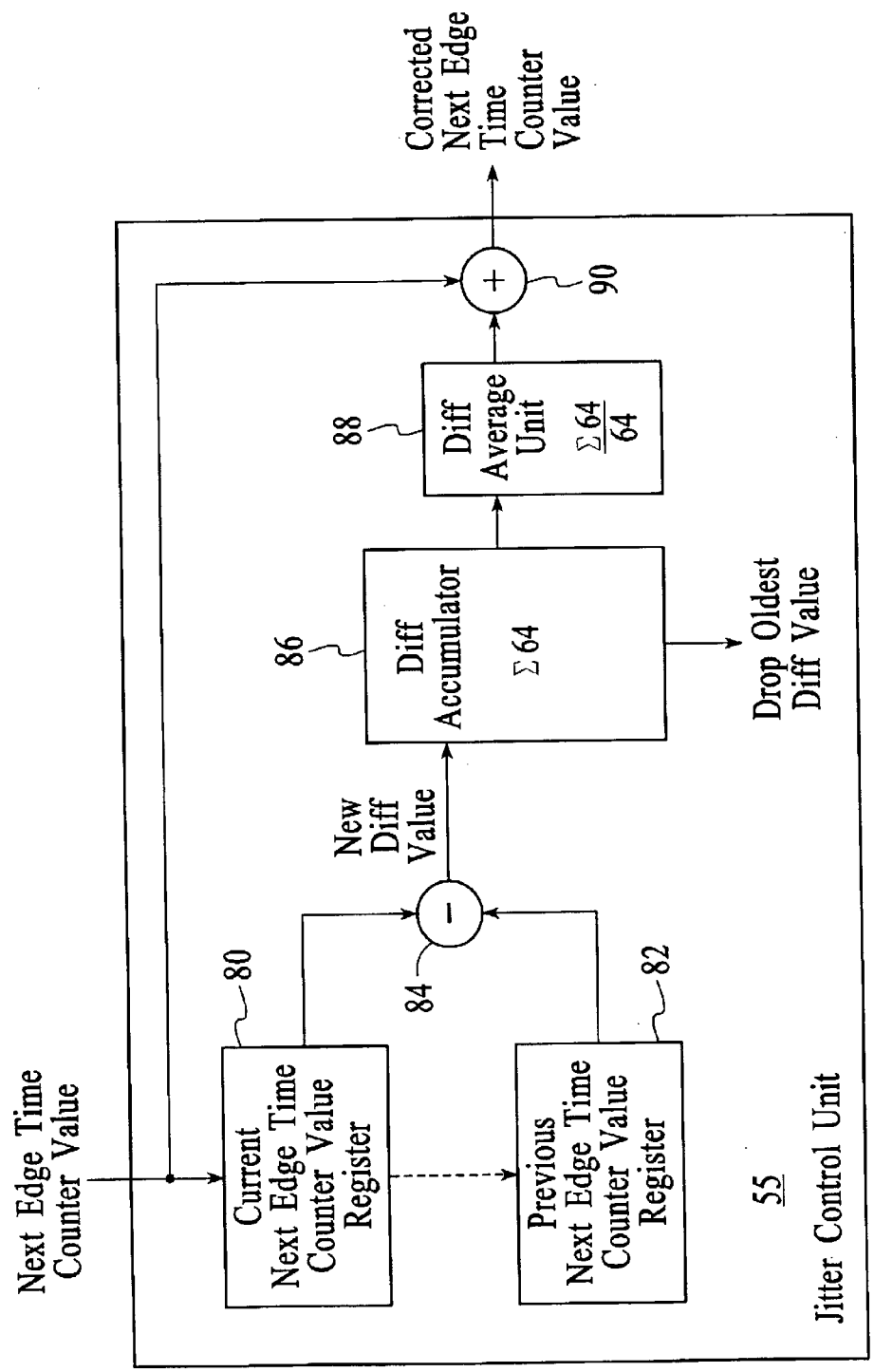
FIG. 12 depicts an embodiment of a jitter control unit that corrects for differences in Next Edge Time Counter Values as a running average over sixty-four consecutive Next Edge Time Counter Values.

FIG. 12 depicts an embodiment of jitter control unit 55 that corrects for differences in Next Edge Time Counter Values as a running average over sixty-four consecutive Next Edge Time Counter Values. The jitter control unit of FIG. 12 includes a current Next Edge Time Counter Value register 80, a previous Next Edge Time Counter Value register 82, a subtractor 84, a DIFF accumulator 86, a DIFF average unit 88, and an adder 90. In operation, Next Edge Time Counter Values are fed into the current Next Edge Time Counter Value register and the previous Next Edge Time Counter Value register in first-in first-out order and the difference between each successive pair of Next Edge Time Counter Values in the registers is found by the subtractor. The differences between the pairs of Next Edge Time Counter Values are summed in the DIFF accumulator. For example, sixty-four differences are summed in the DIFF accumulator, although the number could be different from sixty-four. The average of the sum of the differences is then added to the current Next Edge Time Counter Value to generate a corrected Next Edge Time Counter Value. By correcting the Next Edge Time Counter Values using a running average of the differences, large variances in Next Edge Time Counter Values are smoothed out, thereby minimizing jitter in the subsequently generated 8 kHz clock.

Although the optical link between the master and slave network nodes is described as a 1 GbE optical link, the optical link could be an Ethernet link of a different speed, for example, 100 Mbps, 10 Gbps, or 40 Gbps. Likewise, although the optical link is described as an Ethernet based optical link, the link may involve a different protocol that uses an xB/yB encoding scheme. In addition, although the additional bit stream is described as carrying TDM data, the additional bit stream could carry any type of data. The additional bit stream may include CBR traffic and/or TDM traffic. Further, the additional bit stream may include time sensitive and/or delay sensitive data, such as digital voice and/or video data.

Throughout the description, elements depicted in the figures and described herein represents functional elements of the systems. These functional elements may be physically embodied in hardware (i.e., integrated circuits), software, or a combination thereof. In addition, the physical embodiments of the functional elements may be distributed throughout the respective master and slave network nodes even though they are depicted as discrete units herein for description purposes.

In an embodiment, the clock that is generated at the slave network node may be used to generate other synchronized clocks at the slave network node. For example, the 8 kHz clock that is generated at the slave and may be used to generate a synchronized T1 clock (i.e., 8 kHz*193=1.544 MHz) and/or an E1 clock (i.e., 8 kHz*256=2.048 MHz).

Although the clock distribution technique is described with reference to a point-to-point network connection, the technique could be applied to a point-to-multipoint network environment where the reference clock is distributed from a single network node to multiple remote network nodes.

Although in the embodiments described above, the additional bit stream is multiplexed with the primary bit stream using disparity manipulation as the out-of-band channel, other out-of-band channels may be used to multiplex the additional bit stream, including the clock information, with the primary bit stream.

Multiplexing/Demultiplexing an Additional Bit Stream with a Primary Bit Stream

A technique for multiplexing an additional bit stream with a primary bit stream, where the primary bit stream is encoded into an xB/yB encoded bit stream, involves selecting yB code-words to convey the additional bit stream. In an xB/yB encoding scheme, each xB word can be represented by one yB code-word from a corresponding group of yB code-words, with each group of yB code-words including at least one yB code-word that belongs to a category of yB code-words that tends to exhibit positive DC balance and at least one yB code-word that belongs to a category of yB code-words that tends to exhibit negative DC balance. In an embodiment, the yB code-words in one of the categories are used to represent 1's and the yB code-words in the other category are used to represent 0's. Bits from the additional bit stream are multiplexed with the primary bit stream by selecting yB code-words from one of the two categories to convey 1's and by selecting yB code-words from the other category to convey 0's. In an embodiment, when yB code-words are not being selected to convey bits of the additional bit stream, the yB code-words are selected to balance the RD of the encoded bit stream.

In an embodiment, the selection of yB code-words is alternated between multiplexing a bit of the additional bit with the primary bit stream and balancing the RD of the encoded bit stream. The additional bit stream is demultiplexed from the encoded bit stream by identifying the category of yB code-words to which a multiplexed yB code-word belongs. For example, yB code-words belonging to one category of the yB code-words represent 1's (i.e., the category of yB code-words that tends to exhibit positive DC balance) and yB code-words belonging to the other category of the yB code-words represent 0's (i.e., the category of yB code-words that tends to exhibit negative DC balance).

FIG. 13 depicts an example of code selection logic that is involved with multiplexing an additional bit stream with a primary bit stream in an 8B/10B encoded GbE bit stream in accordance with an embodiment of the invention. Specifically, FIG. 13 depicts a series of bits of the primary bit stream, with the series of bits being presented as a sequence of 8B words. The 8B words are identified in column B and the sequence number of each 8B word is identified in column A. Each 8B word is represented by two 10B code-words, as identified in columns D and E, and the corresponding 10B code names of the 10B code-words are identified in column C. In the example of FIG. 13, the 8B/10B encoding scheme is defined by the IEEE 802.3 standard at Clause 36 entitled "Physical Coding Sublayer (PCS) and Physical Medium Attachment (PMA) sublayer, type 1000BASE-X," which is incorporated by reference herein. In the example of FIG. 13, a single bit of the additional bit stream is multiplexed with the primary bit stream at every other 8B word of the primary bit stream. The bits of the additional bit stream that are to be multiplexed with the primary bit stream are identified in column F of FIG. 13. As shown in FIG. 13, a first bit (0) of the additional bit stream is to be multiplexed with the first 8B word (sequence number 1) and a second bit (1) of the additional bit stream is to be multiplexed with the third 8B word (sequence number 3). As stated above, each 8B word can be identified by at least one 10B code-word from the category of 10B code-words that tends to exhibit positive DC balance (i.e., column D) and by at least one 10B code-word from the category of 10B code-words that tends to exhibit negative DC balance (i.e., column E). The bits of the additional bit stream are multiplexed with the primary bit stream by dictating the category from which the 10B code-words are selected. For example, the 10B code-words from the category of 10B code-words that tends to exhibit positive DC balance are selected to multiplex 1's (i.e., "high" bits) with the primary bit stream and the 10B code-words from the category of 10B code-words that tends to exhibit negative DC balance are selected to multiplex 0's (i.e., "low" bits) with the primary bit stream. When bits are not being multiplexed with the primary bit stream, the 10B code-words are selected to balance the RD of the encoded bit stream.

In accordance with an embodiment of the invention, the 10B code-word selection logic for each 8B word is identified in column G of FIG. 13. Referring to column G, the first 10B code-word is selected to multiplex a bit of the additional bit stream (see sequence number 1) and the next 10B code-word is selected to balance the RD of the encoded bit stream (see sequence number 2). In the example of FIG. 13, the additional bits are multiplexed in an alternating fashion such that one 10B code-word is selected to multiplex a bit with the primary bit stream and the next 10B code-word is selected to balance the RD of the encoded bit stream. The process is repeated as necessary to convey the additional bit stream. While the code selection logic depicted in FIG. 13 alternates at each 8B word between selecting a 10B code-word to multiplex a bit and selecting a 10B code-word to balance the RD, the code selection logic that is known in the prior art is focused solely on balancing the RD of the encoded bit stream.

Although the example described with reference to FIG. 13 involves additional bits being multiplexed with every other 10B code-word, the interval of bit multiplexing can be different. For example, every $n^{th}$ 10B code-word can be manipulated to multiplex a bit of data, where n is an integer of two or greater (n≧2). In addition, a pattern of 10B code-words other than a constant interval can be used to multiplex bits as long as the pattern is known by the receiving end device. The particular distribution of multiplexed bits is not critical as long as the distribution is known by the receiving end device.

Although additional bits can be multiplexed every $n^{th}$ yB code-word, where n is an integer of two or greater (n≧2), or in other known patterns, additional bits should not be multiplexed at every yB code-word over an extended series of code-words. Additional bits should not be multiplexed at every yB code-word over an extended series of code-words because it would interfere with the ability to ensure that the encoded bit stream exhibits a balanced RD. That is, if none of the yB code-words in an extended series of code-words are selected to balance the RD of the encoded bit stream, then the RD of the encoded bit stream would drift as a function of the additional bit stream with no assurance that the RD of the encoded bit stream would be balanced. Although bits should not be multiplexed at every yB code-word over an extended series of code-words, particular distributions with successive multiplexed bits may be implemented.

Although the multiplexing scheme is described above with reference to an 8B/10B encoding scheme for example purposes, the multiplexing scheme is applicable to other xB/yB encoding schemes (i.e., 4B/5B encoding for 100 Mbps Ethernet), where x is less than y. In addition, although the multiplexing scheme is described with reference to the IEEE 802.3 GbE standard, the multiplexing scheme can be applied to other transmission techniques or standards that use xB/yB encoding.

The same encoding scheme can be used with data code groups and/or special code groups (i.e., the "D" codes and "K" codes as defined in the IEEE 802.3 GbE standard). For example, when there is no in-band traffic (i.e., D codes) being transmitted across a link, special codes, including ordered sets such as Idle codes, can be manipulated in a similar manner as described above to multiplex an additional bit stream with an encoded bit stream. Multiplexing bits of the additional bit stream using D codes or K codes enables the bits of the additional bit stream to be conveyed at a constant rate regardless of the transmission patterns of the in-band traffic.

In an embodiment, the additional bit stream that is multiplexed with the primary bit stream conveys constant bit rate (CBR) traffic. For example, the additional bits stream may convey voice traffic such as time division multiplexed (TDM) voice traffic. In an embodiment, the additional bit stream includes CBR traffic, such as E1, T1, E3, DS-3, Ocn, and/or ISDN. In a GbE embodiment in which an additional bit is multiplexed with the primary bit stream at every other 10B code-word, the additional bit stream can be conveyed at a rate of 62.5 Mbps.

Figure 14:
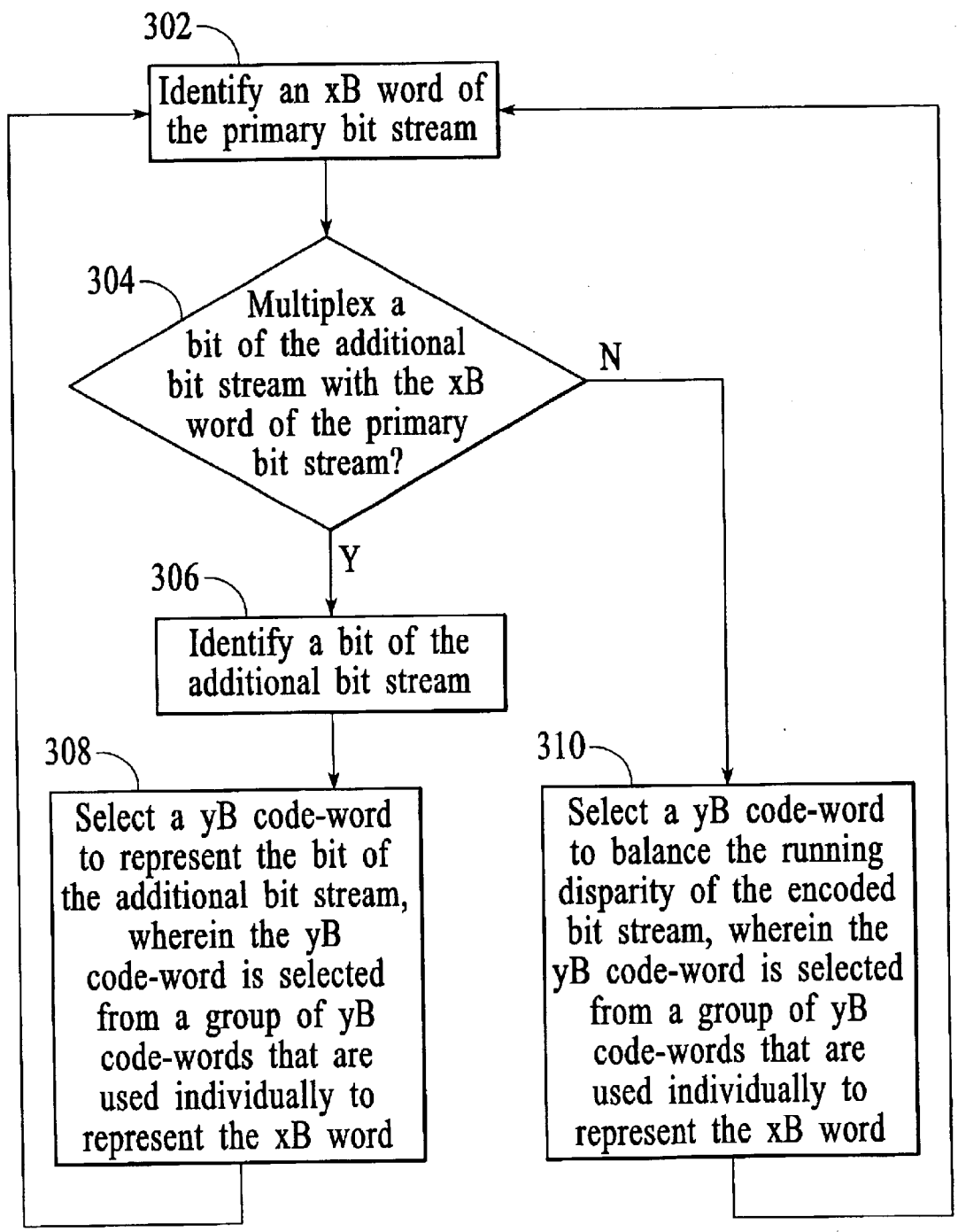
FIG. 14 depicts a process flow diagram of a method for multiplexing an additional bit stream with a primary bit stream where the primary bit stream is encoded into an xB/yB encoded bit stream in accordance with an embodiment of the invention.

FIG. 14 depicts a process flow diagram of a method for multiplexing an additional bit stream with a primary bit stream, where the primary bit stream is encoded into an xB/yB encoded bit stream. At block 302, a first xB word of the primary bit stream is identified. At decision block 304, a determination is made as to whether or not a bit from the additional bit stream is to be multiplexed with the respective xB word. If a bit from the additional bit stream is to be multiplexed with the respective xB word, then at block 306, the bit of the additional bit stream is identified. At block 308, a yB code-word is selected to represent the bit of the additional bit stream, wherein the yB code-word is selected from a group of yB code-words that are used individually to represent the xB word. If a bit from the additional bit stream is not to be multiplexed with the respective xB word, then at block 310, a yB code-word is selected to balance the running disparity, RD, of the encoded bit stream, wherein the yB code-word is selected from a group of yB code-words that are used individually to represent the xB word. After the selection at block 308 or 310 is completed, the process returns to block 302.

According to the 8B/10B encoding scheme of the IEEE 802.3 GbE standard, 72 of the 256 possible 8B words are represented by a single 10B code-word. That is, the 10B code-words in the two categories of 10B code-words are identical. Because it would be impossible to decipher whether a selected 10B code-word is supposed to represent a one or a zero in the above-described multiplexing scheme, in an embodiment of the invention, 8B words that are identified by a single 10B code-word under the given GbE standard are provided with two 10B code-words that are unique to each other and to the rest of the 10B code-words that are utilized in the IEEE 802.3 GbE standard. In an embodiment, one of the two code-words is established as belonging to the category of code-words that tends to exhibit positive DC balance and the other of the two code-words is established as belonging to the category of code-words that tends to exhibit negative DC balance. For example, with reference to the IEEE 802.3 GbE standard, the code group D17.6, with the octet value D1 (110 10001) is identified by the same 10B code-word (100011 0110) regardless of the category from which the code-word is selected. In order for 1's and 0's to be distinguished in the above-described multiplexing scheme, the 8B word should have two different 10B code-words established. In an embodiment, the translation of codes is accomplished with a pre-established translation table. Although the translated code-words are not specified in the IEEE 802.3 GbE standard, the code-words can be used in conjunction with the 8B/10B encoding standard by translating between the native code-words (i.e., the 10B code-words that conform to the given standard) and the translated set of unique 10B code-words. Although the code-word translation scheme is described with reference to 8B/10B encoding in a GbE environment, the code-word translation scheme could be applied to other xB/yB encoding schemes.

Figure 15:
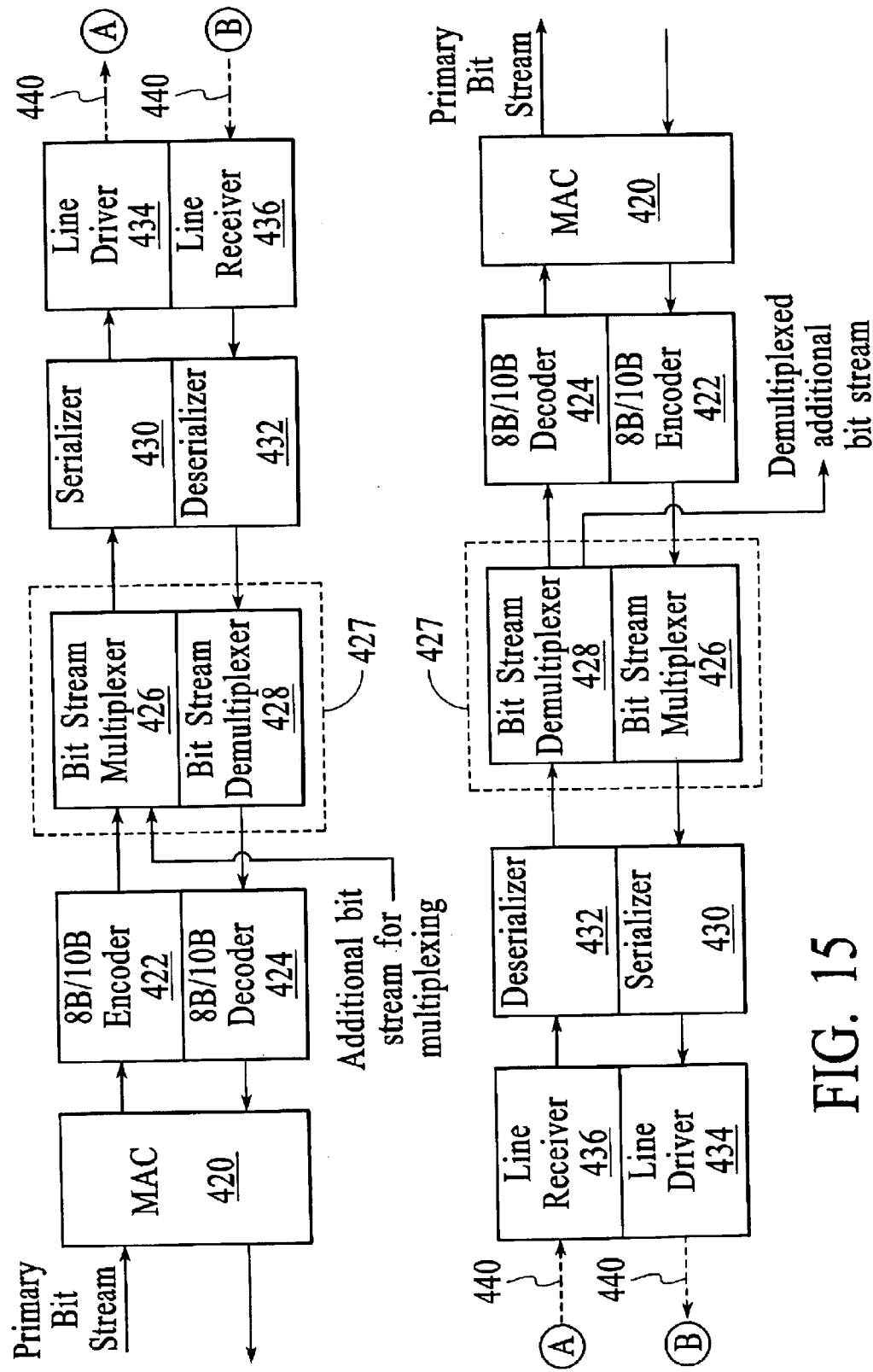
FIG. 15 depicts an example of functional elements that constitute opposite end points in a GbE point-to-point link including functional elements for accomplishing bit stream multiplexing and demultiplexing in accordance with an embodiment of the invention.

In an embodiment, the additional bit stream is multiplexed with the primary bit stream and conveyed across a point-to-point link. FIG. 15 depicts an example of functional elements that constitute opposite end points in a GbE point-to-point link including functional elements for accomplishing bit stream multiplexing and demultiplexing as described above. In the example of FIG. 15, in which an additional bit stream is multiplexed with a GbE primary bit stream, each of the GbE end points includes a media access controller (MAC) 420, an 8B/10B Encoder 422, an 8B/10B Decoder 424, a Bit Stream Multiplexer 426, a Bit Stream Demultiplexer 428, a Serializer 430, a Deserializer 432, a Line Driver 434, and a Line Receiver 436. The two end points in the point-to-point link are often connected by a transmission medium such as optical fiber or copper wire. Throughout the description, similar reference numbers may be used to identify similar elements.

The MACs 420 provide framing, forwarding, and address control logic for packet transmissions between the end points. The functional elements of the two end points are briefly described herein for an example transmission from left to right and from the upper end point to the lower end point as depicted in FIG. 15. On the transmitting end of the point-to-point link (i.e., the upper group of logical elements), the MAC determines to which port or ports outgoing packets should be sent. On the receiving end of the point-to-point link (i.e., the lower group of logical elements), the MAC reads the MAC header of incoming frames and may perform a look-up (layer 2 look-up) to determine how to forward the incoming frames to their next destination within the receiving device.

On the transmitting end of the point-to-point link, the 8B/10B Encoder 422 encodes 8B words into 10B code-words and the Bit Stream Multiplexer 426 multiplexes the additional bit stream with the primary bit stream. A more detailed description of the Bit Stream Multiplexer and the multiplexing process is provided below. The Serializer 430 converts 10B wide parallel data into 1B wide serial data. The Line Driver 434 converts the 1B wide serial data stream into signals that can be transmitted across the link 440. For example, the Line Driver generates optical signals for transmission over an optical link or electrical signals for transmission over a wire link.

On the receiving end of the point-to-point link, the Line Receiver 436 converts the received signals into an electrical signal format that can be utilized by the subsequent logical elements and outputs 1B wide serial data. The Deserializer 432 converts the 1B wide serial data back into 10B wide parallel data and the Bit Stream Demultiplexer 428 demultiplexes the additional bit stream from the primary bit stream. A more detailed description of the Bit Stream Demultiplexer and the demultiplexing process are provided below. The 8B/10B Decoder 424 decodes the 10B code-words back to the native 8B words and passes the 8B words to the receiving end MAC 420.

Figure 16:
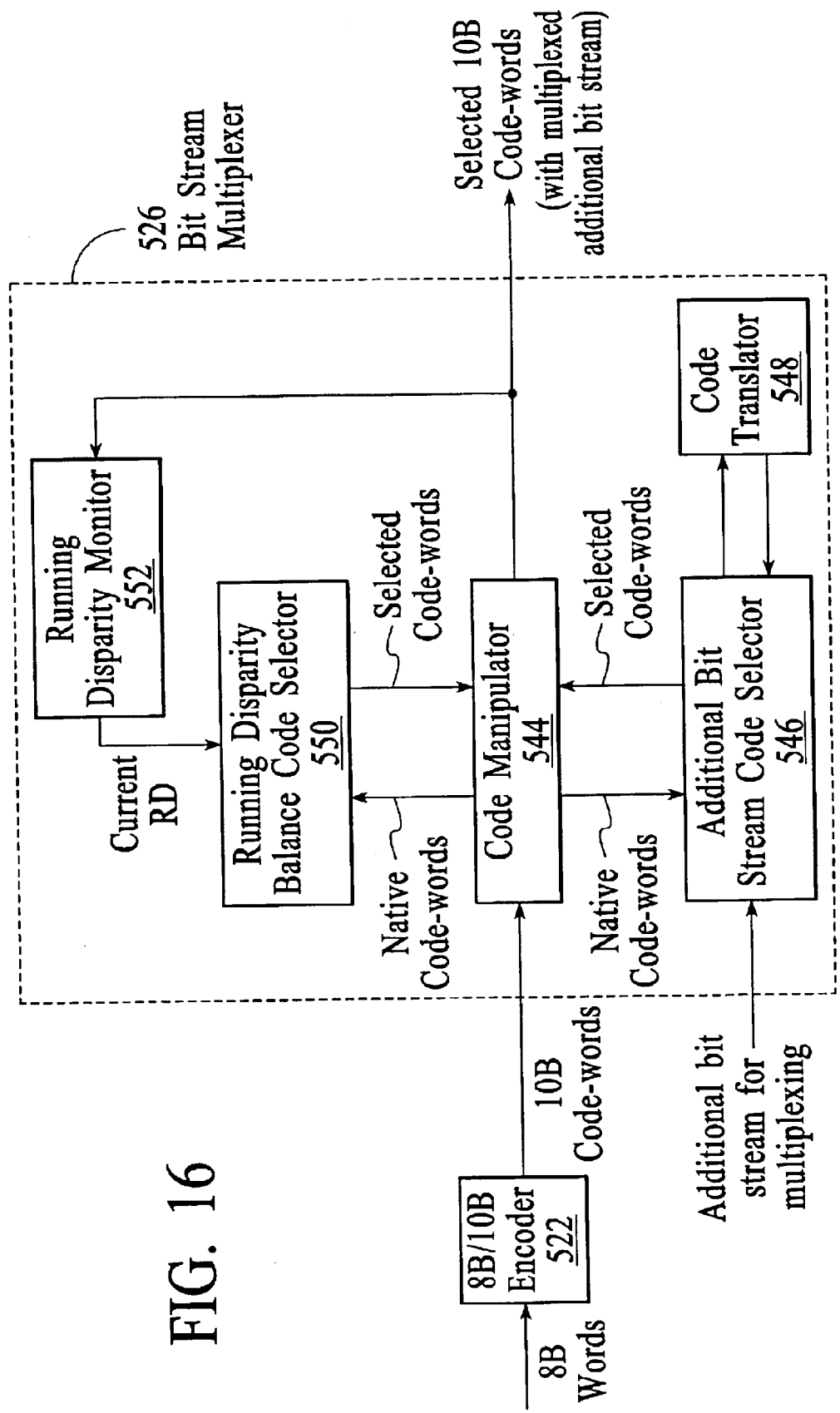
FIG. 16 depicts an expanded view of one of the Bit Stream Multiplexers depicted in FIG. 15.

FIG. 16 depicts an expanded view of one of the Bit Stream Multiplexers depicted in FIG. 15. The Bit Stream Multiplexer 526 depicted in FIG. 16 includes the following functional elements: a Code Manipulator 544, an Additional Bit Stream Code Selector 546, a Code Translator 548, a Running Disparity Balance Code Selector 550, and a Running Disparity Monitor 552. In general, the Bit Stream Multiplexer receives native 10B code-words and an additional bit stream for multiplexing and outputs selected 10B code-words that include the multiplexed additional bit stream. Each functional element of the Bit Stream Multiplexer is described in more detail below.

The Code Manipulator 544 receives native 10B code-words (that is, the original 10B code-words from an 8B/10B Encoder) and determines whether the 10B code-words will be processed via the Additional Bit Stream Code Selector 546 or the Running Disparity Balance Code Selector 550. In an embodiment, the native 10B code-words are received from an 8B/10B Encoder 522, with the 8B/10B Encoder having selected the 10B code-words, according to the given standard, to represent the respective 8B words. The 10B code-words that are used to convey the bits of the additional bit stream are processed by the Additional Bit Stream Code Selector and the 10B code-words that are used to balance the RD are processed by the Running Disparity Balance Code Selector. In an embodiment, the 10B code-words are processed by the two functional elements on an every other 10B code-word interval, however, as noted above, other multiplexing intervals or patterns are possible. Once a 10B code-word has been selected by either the Additional Bit Stream Code Selector or the Running Disparity Balance Code Selector, the Code Manipulator ensures that the output code-word reflects the selected code-word. In an embodiment, the Code Manipulator may include the 8B/10B encoding functions such that the Code Manipulator receives the 8B word stream and outputs the selected 10B code-words.

The Additional Bit Stream Code Selector 546 selects a 10B code-word from the available group of code-words that are used individually to represent the respective 8B word in response to the bit value of the next bit in the additional bit stream. That is, the additional bit stream that is being multiplexed with the primary bit stream dictates which 10B code-word is selected to represent the respective 8B word. In an embodiment, the 10B code-words are selected from the category of code-words that tends to exhibit positive DC balance or from the category of code-words that tends to exhibit negative DC balance. In an embodiment, the code-words in the category that tends to exhibit positive DC balance are selected to represent 1's of the additional bit stream and the code-words in the category that tends to exhibit negative DC balance are selected to represent 0's of the additional bit stream. An indication of the selected code-words is communicated from the Additional Bit Stream Code Selector to the Code Manipulator 544.

The Code Translator 548 manages the translation of 10B code-words in the case of the 8B words that are represented by a single 10B code-word. As described above, according to the IEEE 802.3 GbE standard, 72 of the 256 possible 8B words are represented by a single 10B code-word. When an 8B word is represented by a single 10B code-word, provisions are made to represent the 8B word by at least two different 10B code-words, with one of the 10B code-words belonging to the category of 10B code-words that tends to exhibit positive DC balance and one of the code-words belonging to the category of 10B code-words that tends to exhibit negative DC balance. In the embodiment of FIG. 16, the Code Translator contains all of the translated code-words for the 8B words that are represented by a single 10B code-word according to the IEEE 802.3 GbE standard. When a native 10B code-word that is one of the 72 single-code words is encountered, the Additional Bit Stream Code Selector 546 refers to the Code Translator to determine which translated code-word should be selected to represent the respective bit from the additional bit stream. In an embodiment, the selected code-word is identified by accessing a code translation table that includes the translation rules for all 72 of the 8B words that are represented by a single 10B code-word. An indication of the selected code-word is provided to the Code Manipulator 544 and the selected 10B code-word is output from the Bit Stream Multiplexer 526. The selected 10B code-word conveys a bit from the additional bit stream.

The Running Disparity Balance Code Selector 550 selects 10B code-words from the available group of code-words that are used individually to represent the respective 8B word in response to the current RD. In an embodiment, the 10B code-words are selected to balance the RD of the encoded bit stream. As is known in the field, if the current RD is negative, then a 10B code-word from the category of code-words that tends to exhibit a positive DC balance is selected to represent the respective 8B word and if the current RD is positive, then a 10B code-word from the category of code-words that tends to exhibit a negative DC balance is selected to represent the respective 8B word. The RD balancing rules for GbE are described in the "Clause 36" document that is referred to above.

In the example of FIG. 16, the Running Disparity Balance Code Selector 550 receives an indication of the current RD of the encoded bit stream from the Running Disparity Monitor 552. In an embodiment, the Running Disparity Monitor includes a single bit of information that indicates whether the encoded bit stream is leaning towards too many 1's (positive disparity or RD+) or leaning towards too many 0's (negative disparity or RD−).

Once the Code Manipulator 544 receives an indication of the selected 10B code-word for the respective native 10B code-word, the Code Manipulator ensures that the output 10B code-word reflects the selected 10B code-word. If the selected 10B code-word remains unchanged from the native code-word, then the 10B code-word is forwarded from the Bit Stream Multiplexer 526 as is. If the selected 10B code-word is different than the native code-word, then the selected 10B code-word is generated and output from the Bit Stream Multiplexer. In an embodiment, the selected 10B code-word is generated by manipulating the native 10B code-word. For example, changing the native 10B code-word from one category to the other may involve inverting the bits of the 10B code-word. The selected 10B code-words are output from the Bit Stream Multiplexer to subsequent functional units such as the Serializer.

Figure 17:
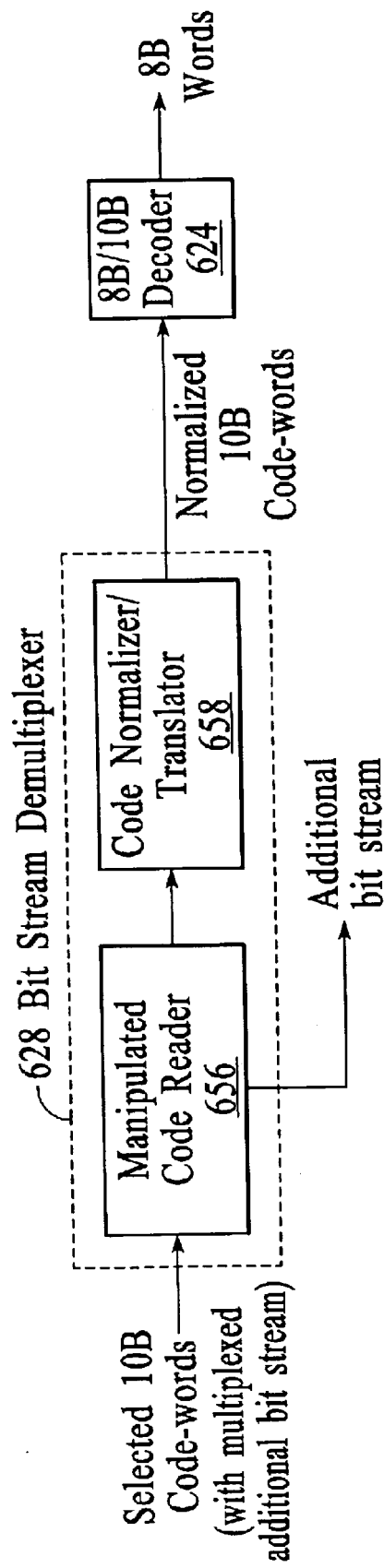
FIG. 17 depicts an expanded view of one of the Bit Stream Demultiplexers depicted in FIG. 15.

FIG. 17 represents an expanded view of one of the Bit Stream Demultiplexers 428 depicted in FIG. 15. The Bit Stream Demultiplexer 628 depicted in FIG. 17 includes the following functional elements: a Manipulated Code Reader 656 and a Code Normalizer/Translator 658. The Manipulated Code Reader reads the multiplexed bit stream by identifying the value of the 10B code-words that carry the multiplexed bits. That is, in the example of FIG. 13, the Manipulated Code Reader reads every other 10B code-word (i.e., sequence numbers 1 and 3) to determine if the manipulated 10B code carries a one or a zero. The code-words from sequence numbers 2 and 4 are disregarded. The determination of whether the manipulated 10B code-words carries a one or a zero involves determining the category to which the 10B code-word belongs. For example, if the 10B code-word belongs to the category of 10B code-words that tends to exhibit positive DC balance, then the 10B code-word carries a "1" and if the 10B code-word belongs to the category of 10B code-words that tends to exhibit negative DC balance, then the 10B code-word carries a "0."

In an embodiment, after reading the 10B code-words to demultiplex the additional bits from the primary bit stream, the manipulated 10B code-words are normalized. That is, all of the 10B code-words that have been changed from the native 10B code-word stream are returned back to their native state. In addition, any 10B code-word that has been translated to a unique 10B code-word is translated back to the 10B code-word that is recognized by the 8B/10B encoding standard. In the embodiment of FIG. 17, normalization and translation is accomplished by the Code Normalizer/Translator 658. The normalized and translated 10B code stream can then be forwarded to the 8B/10B Decoder 624 for decoding to the original 8B code stream.

FIGS. 15–17 depict functional elements for description purposes. It should be understood that these functional elements may or may not be embodied in corresponding distinct physical devices. Specifically, the functional elements may be separate from each other, integrated with each other or any combination thereof. In an embodiment, the functional elements described above are embodied in a combination of hardware and software, however, the functional elements can be embodied primarily in hardware or software. In an embodiment, many of the functional elements of the Bit Stream Multiplexer and the Bit Stream Demultiplexer are embodied in one or more application specific integrated circuits (ASICs) as indicated by dashed boxed 427.

FIG. 18 depicts a table that details the differences between the encoding of a GbE bit stream according to the prior art and the encoding of a GbE bit stream that includes a multiplexed additional bit stream in accordance with an embodiment of the invention. The example described with reference to FIG. 18 involves a primary bit stream, in a GbE environment, that is encoded according to the 8B/10B encoding scheme specified in the IEEE 802.3 GbE standard. In the example, column A identifies a sequence number of 8B words of a primary bit stream and column B identifies the sequence of 8B words of the example GbE bit stream. Column C identifies the byte value of the respective 8B words and column D identifies the code group name for the respective 8B words (as defined by the IEEE 802.3 standard, Clause 36, Physical Coding Sublayer (PCS) and Physical Medium Attachment (PMA) sublayer, type 1000BASE-X). Columns E and F represent the two 10B code-words, according to the IEEE 802.3 GbE standard, for the respective 8B word that is provided in column B. The 10B code-words in column E are identified herein as (+) because they belong to the category of code-words that tends to exhibit a positive DC balance (bias) and the 10B code-words in column F are identified herein as (−) because they belong to the category of code words that tends to exhibit a negative DC balance (bias). It should be noted that the 10B code-words that have an equal number of 1's and 0's actually have a neutral bias. Column G identifies whether the 10B code-words that represent the respective 8B words cause the RD of an encoded bit stream to stay the same (as indicated by an "S") or to flip (as indicated by an "F"). A 10B code-word causes the RD of an encoded bit stream to stay the same if the number of 0's and 1's in the 10B code-word is balanced and the 10B code-word causes the RD of the encoded bit stream to flip if the number of 0's and 1's in the 10B code-word is unbalanced. Column H identifies an example current RD that may result from the example primary bit stream of column B. In the example column H, the RD is either positive (+) or negative (−) and it is assumed, for example purposes, that the initial RD is negative (i.e., RD−).

Column I identifies the 10B code-words that are selected to represent the respective 8B word in column B (assuming an initial negative RD), as is known in the prior art where the 10B code-words are selected solely to balance the RD. In accordance with the prior art, the 10B code-word for each 8B word is selected from the two possible code-words in response to the current RD that is depicted in column H. That is, if the current RD in column H is negative (−), then the 10B code-word from column E (the "+" code-word) is selected to represent the 8B word and likewise, if the current RD is positive (+), then the 10B code-word in column F (the "−" code) is selected to represent the 8B word. Column J identifies the RD that results from processing the respective 10B code-words. In the example of FIG. 18, the resulting RD (i.e., column J) for one sequence number is carried over to the current RD (i.e., column H) for the next sequence number. As is known in the field, the current RD is adjusted in response to each new 10B code-word that is processed. Specifically, if the processed 10B code-word is an "S" code-word, then the current RD stays the same upon processing of the 10B code-word and if the 10B code-word is a "F" code-word, then the RD flips from positive to negative or negative to positive upon processing of the 10B code-word. For example, with reference to column H at sequence number 1, the current RD is negative (RD−) and as a result, the 10B code-word from column E is selected. The 10B code-word for sequence number 1 is an "S" and therefore the current RD stays the same (i.e., the RD stays negative). With reference to sequence number 2, the current RD is still negative (RD−) and as a result, the 10B code-word from column E is selected. In contrast to sequence number 1, the 10B code-word for sequence number 2 is an "F" and therefore the current RD flips (i.e., the current RD flips from RD− to RD+).

The multiplexing of an additional bit stream with the primary bit stream of column B is described with reference to columns K, L, M, and N. Specifically, column K represents an example of an additional bit stream that is to be multiplexed with the primary bit stream of column B. In the example, one bit of data is multiplexed with every other 8B word of the column B bit stream. In the example of FIG. 18, one data bit is sent at each of sequence numbers 1, 3, 5, 7, 9, 11, and 13. Column L identifies an example current RD that may result from the multiplexing of the additional bit stream with the primary bit stream, assuming an initial negative RD (RD−). In accordance with an embodiment of the invention, column M represents the 10B code-words that are selected from columns E and F to multiplex the additional bit stream of column K with the primary bit stream of column B. Column N represents the RD of the encoded bit stream given the 10B code-words that are selected in Column M. In the example of FIG. 18, the resulting RD (i.e., column N) for one sequence number is carried over to the current RD (i.e., column L) for the next sequence number.

In the example of FIG. 18, it is assumed that the 10B code-words from column E are used to represent 1's and the 10B code-words from column F are used to represent 0's, although this is implementation specific (i.e., the opposite convention could be used). Referring to columns K and M of sequence number 1, it is desired to multiplex a zero bit (a "low" bit) with the primary bit stream of column B, and therefore the 10B code-word from column F (the category of code-words that tend to exhibit negative DC balance) is selected as the 10B code-word that will be used to represent the respective 8B word. That is, the 10B code-word from column F is selected (instead of the 10B code-word from column E) from the two code-words (columns E and F) in order to represent the desired bit from column K that is being multiplexed with the primary bit stream of column B. In the example, the 10B code-words for the 8B word of sequence number 1 are "S" code-words and therefore the RD stays the same (assuming an initial negative RD, the RD stays negative after the code selection).

Referring now to columns K and M of sequence number 2, no additional bit is being multiplexed with the 8B word from column B, and therefore the selection of the 10B code-word is not made in response to a bit of the additional bit stream. In accordance with an embodiment of the invention, the 10B code-word at sequence number 2 is selected to balance the RD of the encoded bit stream. That is, when the 10B code-word is not used to carry a bit of the additional bit stream, it is used to balance the RD of the encoded bit stream. For example, if the current RD is positive, then a 10B code-word from column F is selected to represent the 8B word and if the current RD is negative, then a 10B code-word from column E is selected to represent the 8B word. In the example of FIG. 18, the current RD at sequence number 2 is negative and therefore the 10B code-word from column E (the "+" code-word) is selected to represent the value of the respective 8B word. In the example, the 10B code-words for the respective 8B word are "F" code-words and therefore the current RD flips from negative (RD−) to positive (RD+). The positive RD is indicated in column N, sequence number 2. The process of selecting the 10B code-words in view of the additional bit stream and the current RD continues as shown in the example of FIG. 18.

As can be seen from the 10B code-word selections identified in columns I and M, the multiplexing of an additional bit stream with the primary bit stream causes the selection of 10B code-words to be altered from the code pattern that is generated without bit multiplexing.

Figure 19:
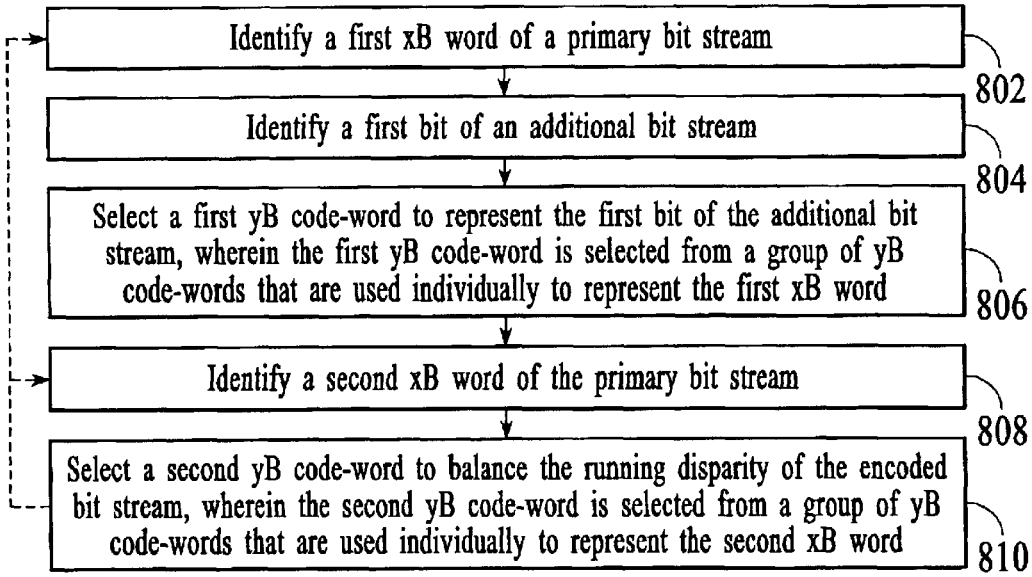
FIG. 19 depicts a process flow diagram of a method for multiplexing an additional bit stream with a primary bit stream in accordance with an embodiment of the invention, where the primary bit stream is encoded into an xB/yB encoded bit stream.

FIG. 19 depicts a process flow diagram of a method for multiplexing an additional bit stream with a primary bit stream in accordance with an embodiment of the invention, where the primary bit stream is encoded into an xB/yB encoded bit stream. At block 802, a first xB word of a primary bit stream is identified. At block 804, a first bit of an additional bit stream is identified. At block 806, a first yB code-word is selected to represent the first bit of the additional bit stream, wherein the first yB code-word is selected from a group of yB code-words that are used individually to represent the first xB word. At block 808, a second xB word of the primary bit stream is identified. At block 810, a second yB code-word is selected to balance the running disparity of the encoded bit stream, wherein the second yB code-word is selected from a group of yB code-words that are used individually to represent the second xB word. The interval of bit multiplexing determines whether the process returns to the top block, 802, or to the intermediate block 808, as indicated by the dashed return lines.

Figure 20:
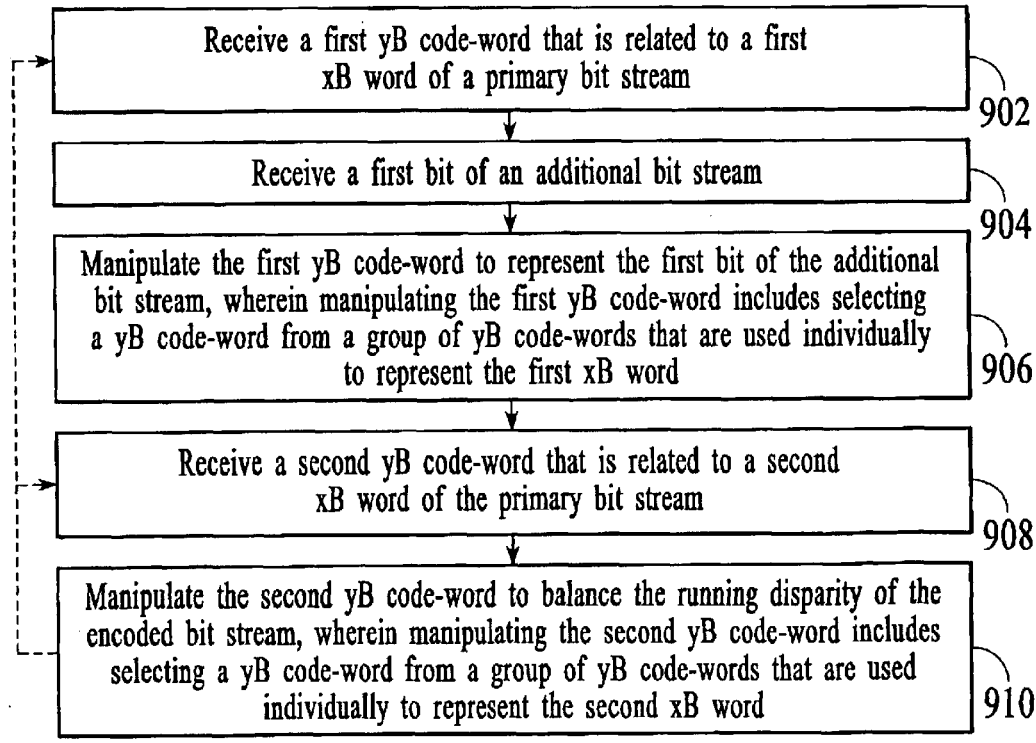
FIG. 20 depicts a process flow diagram of another method for multiplexing an additional bit stream with a primary bit stream in accordance with an embodiment of the invention, where the primary bit stream is encoded into an xB/yB encoded bit stream.

FIG. 20 depicts a process flow diagram of another method for multiplexing an additional bit stream with a primary bit stream in accordance with an embodiment of the invention, where the primary bit stream is encoded into an xB/yB encoded bit stream. At block 902, a first yB code-word that is related to a first xB word of a primary bit stream is received. At block 904, a first bit of an additional bit stream is received. At block 906, the first yB code-word is manipulated to represent the first bit of the additional bit stream, wherein manipulating the first yB code-word includes selecting a yB code-word from a group of yB code-words that are used individually to represent the first xB word. At block 908, a second yB code-word that is related to a second xB word of the primary bit stream is received. At block 910, the second yB code-word is manipulated to balance the running disparity of the encoded bit stream, wherein manipulating the second yB code-word includes selecting a yB code-word from a group of yB code-words that are used individually to represent the second xB word. The interval of bit multiplexing determines whether the process returns to the top block, 902, or to the intermediate block, 908, as indicated by the dashed return lines.

Figure 21:
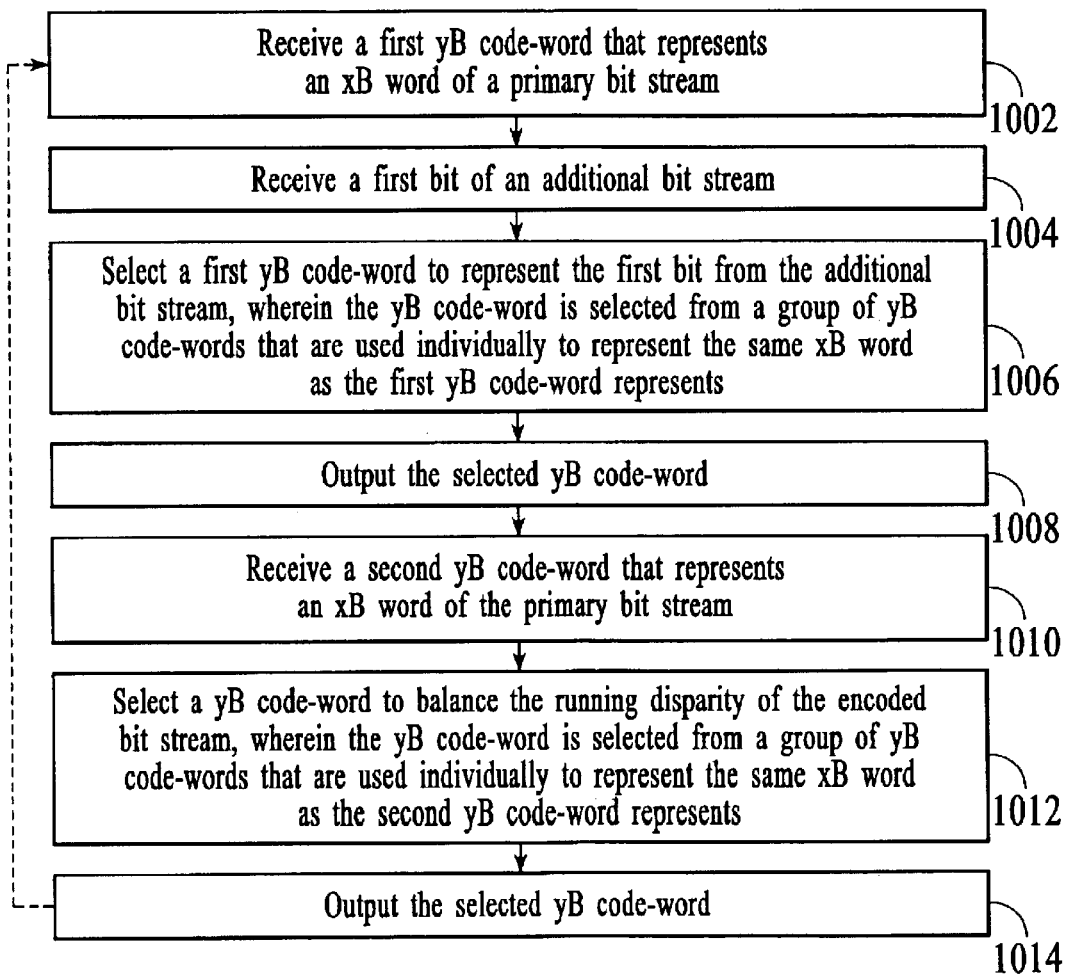
FIG. 21 depicts a process flow diagram of another method for multiplexing an additional bit stream with a primary bit stream in accordance with an embodiment of the invention, where the primary bit stream is encoded into an xB/yB encoded bit stream.

FIG. 21 depicts a process flow diagram of another method for multiplexing an additional bit stream with a primary bit stream in accordance with an embodiment of the invention, where the primary bit stream is encoded into an xB/yB encoded bit stream. At block 1002, a first yB code-word that represents an xB word of a primary bit stream is received. At block 1004, a first bit of an additional bit stream is received. At block 1006, a yB code-word is selected to represent the first bit from the additional bit stream, wherein the yB code-word is selected from a group of yB code-words that are used individually to represent the same xB word as the first yB code-word represents. At block 1008, the selected yB code-word is output. At block 1010, a second yB code-word that represents an xB word of the primary bit stream is received. At block 1012, a yB code-word is selected to balance the running disparity of the encoded bit stream, wherein the yB code-word is selected from a group of yB code-words that are used individually to represent the same xB word as the second yB code-word represents. At block 1014, the selected yB code-word is output. The interval of bit multiplexing determines whether the process returns to the top block, 1002, or to the intermediate block, 1010, as indicated by the dashed return lines.

Although specific embodiments of the invention have been described and illustrated, the invention is not to be limited to the specific forms or arrangements of parts as described and illustrated herein. The invention is limited only by the claims.

What is claimed is:

1. A method for distributing clocking information from a first network node to a second network node in an asynchronous packet-based network comprising:
   embedding clock information into an additional bit stream; and
   multiplexing said additional bit stream with a primary bit stream using an out-of-band channel.

2. The method of claim 1 wherein multiplexing said additional bit stream with said primary bit stream using an out-of-band channel comprises:
   identifying an xB word of said primary bit stream;
   identifying a bit of said additional bit stream; and
   selecting a yB code-word to represent said bit of said additional bit stream, wherein said yB code-word is selected from a group of yB code-words that are used individually to represent said xB word.

3. The method of claim 1 wherein multiplexing said additional bit stream with said primary bit stream using an out-of-band channel comprises:
   receiving a first yB code-word that represents an xB word of said primary bit stream, said primary bit stream being encoded into an xB/yB encoded bit stream;
   receiving a first bit of said additional bit stream;
   selecting a yB code-word to represent said first bit from said additional bit stream, wherein said yB code-word is selected from a group of yB code-words that are used individually to represent the same xB word as said first yB code-word represents;
   receiving a second yB code-word that represents an xB word of said primary bit stream; and
   selecting a yB code-word to balance the running disparity of said xB/yB encoded bit stream, wherein said yB code-word is selected from a group of yB code-words that are used individually to represent the same xB word as said second yB code-word represents.

4. The method of claim 3 further including:
   demultiplexing said additional bit stream from said primary bit stream;
   extracting said clock information from said demultiplexed additional bit stream; and
   generating, using said extracted clock information, a clock at said second network node that is synchronized with a reference clock at said primary network node.

5. The method of claim 4 wherein demultiplexing said additional bit stream from said primary bit stream further includes identifying a received yB code-word as belonging to a category of code-words that tends to exhibit positive DC balance or a category of code-words that tends to exhibit negative DC balance.

6. The method of claim 1 further including obtaining said clock information from a reference clock to which data within said additional bit stream is synchronized.

7. The method of claim 6 wherein said reference clock is an 8 kHz clock.

8. The method of claim 1 wherein embedding clock information into said additional bit stream comprises:
   generating an indicator of a next edge of a reference clock; and
   providing said indicator as at least a portion of said clock information.

9. The method of claim 8 wherein generating said indicator of a next edge of said reference clock includes determining a time difference between a transmitted frame of said additional bit stream and a next edge of said reference clock.

10. The method of claim 9 wherein determining a time difference between a transmitted frame of said additional bit stream and a next edge of said reference clock includes determining a time difference between a start of frame and said next edge of said reference clock.

11. The method of claim 9 further including transmitting frames of said additional bit stream at fixed time intervals.

12. The method of claim 11 wherein said fixed time intervals are longer than the time between edges of said reference clock.

13. The method of claim 1 further comprising:
   transmitting said multiplexed primary and additional bit streams from said first network node to said second network node; and
   generating a clock at said second network node using said clock information.

14. The method of claim 13 wherein said clock that is generated at said second network node is synchronized with a reference clock at said first network node.

15. The method of claim 1 wherein said data within said additional bit stream includes time division multiplexed (TDM) data.

16. The method of claim 15 further including using said clock information to synchronize said TDM data between said first and second network nodes.

17. The method of claim 1 wherein said data within said additional bit stream includes CBR data.

18. The method of claim 17 further including using said clock information to synchronize said CBR data between said first and second network nodes.

19. The method of claim 1 wherein embedding clock information into said additional bit stream includes generating an indicator of a next edge of a reference clock by sampling said reference clock with a 125 MHz system clock.

20. A system for distributing clocking information from a first network node to a second network node in an asynchronous packet-based network comprising:
a clock transport means for embedding clock information into an additional bit stream; and
a multiplexer means for multiplexing said additional bit stream with a primary bit stream using an out-of-band channel.

21. The system of claim 20 wherein said multiplexer means includes:
means for identifying a first xB word and a second xB word of said primary bit stream, said primary bit stream being encoded into an xB/yB encoded bit stream;
means for identifying a first bit of said additional bit stream and for selecting a first yB code-word to represent said first bit of said additional bit stream, wherein said first yB code-word is selected from a group of yB code-words that are used individually to represent said first xB word; and
means for selecting a second yB code-word to balance the running disparity of said encoded bit stream, wherein said second yB code-word is selected from a group of yB code-words that are used individually to represent said second xB word.

22. The system of claim 20 wherein said multiplexer means includes:
a first input for receiving a first yB code-word that is related to a first xB word of said primary bit stream and for receiving a second yB code-word that is related to a second xB word of said primary bit stream, said primary bit stream being encoded into an xB/yB encoded bit stream;
a second input for receiving a first bit of said additional bit stream; and
means for manipulating said first yB code-word to represent said first bit of said additional bit stream, wherein manipulating said first yB code-word includes selecting a yB code-word from a group of yB code-words that are used individually to represent said first xB word, and for manipulating said second yB code-word to balance the running disparity of said xB/yB encoded bit stream, wherein manipulating said second yB code-word includes selecting a yB code-word from a group of yB code-words that are used individually to represent said second xB word.

23. The system of claim 22 further including:
a demultiplexer means for demultiplexing said additional bit stream from said primary bit stream; and
clock receive means for obtaining said clock information from said additional bit stream and for generating a clock from said clock information.

24. The system of claim 23 wherein said demultiplexer means includes means for identifying a received yB code-word as belonging to a category of code-words that tends to exhibit positive DC balance or a category of code-words that tends to exhibit negative.

25. The system of claim 23 wherein said clock receive means includes a digital clock regeneration means for receiving an indicator of a next edge of a reference clock and for utilizing said indicator to generate said clock, said generated clock being synchronized with said reference clock.

26. The system of claim 20 wherein said clock transport means includes means for generating an indicator of a next edge of a reference clock.

27. The system of claim 26 wherein said indicator of a next edge of said reference clock represents a difference between a start of frame and an edge of said reference clock.

28. The system of claim 26 wherein said means for generating an indicator of a next edge of a reference clock includes a digital counter that is incremented by a local clock and a next edge latch means for capturing a digital counter value that corresponds to an edge of said reference clock.

29. A system for distributing clocking information from a first network node to a second network node in an asynchronous packet-based network comprising:
a demultiplexer means for demultiplexing an additional bit stream from a primary bit stream, wherein said additional bit stream is multiplexed with said primary bit stream using an out-of-band channel, said additional bit stream including clock information related to a reference clock; and
clock receive means for obtaining said clock information from said additional bit stream and for generating a clock that is synchronized with said reference clock from said clock information.

30. The system of claim 29 wherein said clock receive means includes a digital clock regeneration means for receiving an indicator of a next edge of said reference clock and for utilizing said indicator to generate said clock that is synchronized with said reference clock.

31. A method for distributing clocking information from a first network node to a second network node in an asynchronous packet-based network comprising:
embedding clock information related to an 8 kHz reference clock into an additional bit stream, wherein said additional bit stream includes data that has a synchronous relationship with said 8 kHz reference clock; and
multiplexing said additional bit stream with a primary bit stream using an out-of-band channel.

32. The method of claim 31 wherein multiplexing said additional bit stream with said primary bit stream using an out-of-band channel comprises:
identifying an xB word of said primary bit stream;
identifying a bit of said additional bit stream; and
selecting a yB code-word to represent said bit of said additional bit stream, wherein said yB code-word is selected from a group of yB code-words that are used individually to represent said xB word.

33. The method of claim 31 wherein multiplexing said additional bit stream with said primary bit stream using an out-of-band channel comprises:
receiving a first yB code-word that represents an xB word of said primary bit stream, said primary bit stream being encoded into an xB/yB encoded bit stream;
receiving a first bit of said additional bit stream;
selecting a yB code-word to represent said first bit from said additional bit stream, wherein said yB code-word is selected from a group of yB code-words that are used individually to represent the same xB word as said first yB code-word represents;

receiving a second yB code-word that represents an xB word of said primary bit stream; and selecting a yB code-word to balance the running disparity of said xB/yB encoded bit stream, wherein said yB code-word is selected from a group of yB code-words that are used individually to represent the same xB word as said second yB code-word represents.

34. The method of claim 31 further including:

demultiplexing said additional bit stream from said primary bit stream;

extracting said clock information from said demultiplexed additional bit stream; and generating, using said extracted clock information, an 8 kHz clock at said second network node that is synchronized with said 8 kHz reference clock at said primary network node.

35. The method of claim 31 wherein embedding clock information into said additional bit stream comprises:

generating an indicator of a next edge of said 8 kHz reference clock; and providing said indicator as at least a portion of said clock information.

36. The method of claim 35 wherein generating said indicator of a next edge of said 8 kHz reference clock includes determining a time difference between a transmitted frame of said additional bit stream and a next edge of said 8 kHz reference clock.

37. The method of claim 36 wherein determining a time difference between a transmitted frame of said additional bit stream and a next edge of said 8 kHz reference clock includes determining a time difference between a start of frame and said next edge of said reference clock.

38. The method of claim 37 further including transmitting frames of said additional bit stream at fixed time intervals.

39. The method of claim 38 wherein said fixed time intervals are longer than the time between edges of said 8 kHz reference clock.

40. The method of claim 31 further comprising:

transmitting said multiplexed primary and additional bit streams from said first network node to said second network node; and generating a clock, at said second network node, that is synchronized with said 8 kHz reference clock using said clock information.

41. The method of claim 31 wherein said data within said additional bit stream includes time division multiplexed (TDM) data.

42. The method of claim 41 further including using said clock information to synchronize said TDM data between said first and second network nodes.

43. The method of claim 31 wherein said data within said additional bit stream includes CBR data.

44. The method of claim 43 further including using said clock information to synchronize said CBR data between said first and second network nodes.

45. The method of claim 31 wherein embedding clock information into said additional bit stream includes generating an indicator of a next edge of said 8 kHz reference clock by sampling said 8 kHz reference clock with a 125 MHz system clock.

* * * * *